United States Patent [19]

Nakanishi et al.

[11] 4,237,803

[45] Dec. 9, 1980

[54] AUTOMATIC ELECTRONIC SEWING MACHINE

[75] Inventors: Tousaku Nakanishi, Nara; Kazuo Suzuki, Higashiosaka; Masayasu Makino, Gose; Nobuyoshi Miyao, Sakurai; Hirokazu Koda, Gose, all of Japan

[73] Assignee: Sharp Kabushiki Kaisha, Osaka, Japan

[21] Appl. No.: 843,639

[22] Filed: Oct. 19, 1977

[30] Foreign Application Priority Data

Oct. 20, 1976 [JP] Japan ............................... 51-126396

[51] Int. Cl.³ ............................................. D05B 3/02

[52] U.S. Cl. ............................................. 112/158 E

[58] Field of Search ........... 112/158 E, 121.12, 121.11

[56] References Cited

U.S. PATENT DOCUMENTS

| | | | |
|---|---|---|---|
| 3,872,808 | 3/1975 | Wurst | 112/158 E |
| 3,977,338 | 8/1976 | Wurst et al. | 112/121.11 X |
| 4,016,821 | 4/1977 | Minalga | 112/158 E |
| 4,051,794 | 10/1977 | Herzer et al. | 112/121.12 |
| 4,122,786 | 10/1978 | Tanimoto et al. | 112/158 E |
| 4,142,474 | 3/1979 | Bowles | 112/158 E |

FOREIGN PATENT DOCUMENTS

| | | | |
|---|---|---|---|
| 2618053 | 12/1976 | Fed. Rep. of Germany | 112/158 E |

*Primary Examiner*—Peter P. Nerbun

*Attorney, Agent, or Firm*—Birch, Stewart, Kolasch & Birch

[57] ABSTRACT

A read only memory (ROM) is provided for storing digital information related to stitch patterns and control instructions for stitch formation purposes. A keyboard means is provided for selecting a desired stitch pattern and control instruction stored in the ROM. Selected digital information is introduced into a random access memory (RAM) and temporarily stored therein. The RAM develops control signals for controlling the needle position and the work feed in accordance with the control instruction selected through the keyboard means.

31 Claims, 42 Drawing Figures

(C)

| | KEY CODE | SYMBOL | |
|---|---|---|---|
| 0 | 0 0 0 0 | ----- | P0 |
| 0 | 0 0 0 1 |  | P1 |
| 0 | 0 0 1 0 |  | P2 |
| 0 | 0 0 1 1 |  | P3 |
| 0 | 0 1 0 0 |  | P4 |
| 0 | 0 1 0 1 |  | P5 |
| 0 | 0 1 1 0 |  | P6 |
| 0 | 1 0 0 0 |  | P7 |
| 0 | 1 0 0 1 |  | P8 |
| 0 | 1 0 1 0 |  | P9 |
| 0 | 1 0 1 1 |  | P10 |
| 0 | 1 1 0 0 | ≡≡≡ | P11 |
| 0 | 1 1 0 1 |  | P12 |
| 0 | 1 1 1 0 |  | P13 |
| 1 | 0 0 0 0 |  | P14 |
| 1 | 0 0 0 1 |  | P15 |
| 1 | 0 0 1 0 | — — | P16 |
| 1 | 0 0 1 1 |  | P17 |
| 1 | 0 1 0 0 |  | P18 |
| 1 | 0 1 0 1 |  | P19 |
| 1 | 0 1 1 0 |  | P20 |

| | KEY CODE | SYMBOL | |
|---|---|---|---|
| 1 | 1 0 0 0 |  | P21 |
| 1 | 1 0 0 1 |  | P22 |
| 1 | 1 0 1 0 |  | P23 |
| 1 | 1 0 1 1 |  | P24 |
| | | | |
| | | | |
| 1 | 1 1 0 0 |  | P25 |

FIG. 18

| | RAM ADDRESS | X | Y | RAM ADDRESS | | | |
|---|---|---|---|---|---|---|---|
| TWENTY-FIRST STITCH | 1 | 30 | 23 | 17 | 21 | 25 | |
| | 2 | 30 | 24 | 18 | 15 | 6 | |
| | 3 | 30 | 6 | 19 | 30 | 24 | |
| | 4 | 15 | 25 | 20 | 30 | 23 | SECOND STITCH |
| | 5 | 21 | 21 | 21 | 30 | 23 | FIRST STITCH |
| | 6 | 30 | 15 | 22 | | | |
| | 7 | 15 | 9 | 23 | | | |
| | 8 | 12 | 17 | 24 | | | |
| | 9 | 0 | 18 | 25 | | | |
| | 10 | 6 | 18 | 26 | | | |
| | 11 | 0 | 18 | 27 | | | |
| | 12 | 6 | 18 | 28 | | | |
| | 13 | 0 | 17 | 29 | | | |
| | 14 | 12 | 9 | 30 | | | |
| | 15 | 15 | 15 | 31 | | | |
| | 16 | 30 | 21 | 32 | | | |

FIG. 19

| RAM ADDRESS | X | Y |
|---|---|---|
| 1 | 0 | 15 |
| 2 | 0 | 15 |
| 3 | 0 | 15 |
| 4 | 19 | 15 |
| 5 | 0 | 15 |
| 6 | 19 | 15 |
| 7 | 0 | 15 |
| 8 | 19 | 15 |
| 9 | 0 | 15 |
| | | |

FIG. 20(A)

| RAM ADDRESS | X | Y |
|---|---|---|
| 1 | 4 | 17 |
| 2 | 13 | 17 |
| 3 | 4 | 17 |
| 4 | 13 | 17 |
| 5 | 4 | 15 |
| 6 | 25 | 15 |
| 7 | 4 | 15 |
| 8 | 25 | 15 |
| 9 | 4 | 15 |
| 10 | 25 | 15 |
| 11 | 15 | 14 |

FIG. 20(B)

| RAM ADDRESS | X | Y |
|---|---|---|
| 1 | 25 | 13 |
| 2 | 16 | 13 |
| 3 | 25 | 13 |
| 4 | 16 | 13 |
| 5 | 25 | 15 |
| 6 | 4 | 15 |
| 7 | 25 | 15 |
| 8 | 4 | 15 |
| 9 | 25 | 15 |
| 10 | 4 | 15 |

FIG. 21

| RAM ADDRESS | X | Y | | X | Y | | X | Y | |
|---|---|---|---|---|---|---|---|---|---|
| 1 | 30 | 25 | 17 | 0 | 27 | 33 | 15 | 5 | |
| 2 | 30 | 25 | 18 | 6 | 27 | 34 | 19 | 18 | |
| 3 | 30 | 21 | 19 | 4 | 27 | 35 | 30 | 27 | |
| 4 | 30 | 26 | 20 | 4 | 27 | 36 | 30 | 27 | |
| 5 | 30 | 25 | 21 | 5 | 22 | 37 | 30 | 27 | ← FIRST STITCH |
| 6 | 30 | 25 | 22 | 0 | 19 | 38 | | | |
| 7 | 30 | 23 | 23 | 0 | 18 | 39 | | | |
| 8 | 30 | 7 | 24 | 7 | 10 | 40 | | | |
| 9 | 30 | 12 | 25 | 11 | 10 | 41 | | | |
| 10 | 19 | 3 | 26 | 7 | 18 | 42 | | | |
| 11 | 20 | 3 | 27 | 0 | 19 | 43 | | | |
| 12 | 19 | 11 | 28 | 0 | 19 | 44 | | | |
| 13 | 30 | 9 | 29 | 3 | 18 | 45 | | | |
| 14 | 30 | 18 | 30 | 8 | 17 | 46 | | | |
| 15 | 20 | 15 | 31 | 16 | 10 | 47 | | | |
| 16 | 11 | 4 | 32 | 20 | 10 | 48 | | | |

FIG. 22

| | X | Y |
|---|---|---|
| 1 | 15 | 22(29) |
| 2 | 15 | 22(29) |
| 3 | 15 | 22(29) |
| 4 | 15 | 22(29) |
| 5 | 15 | 22(29) |
| 6 | 15 | 22(29) |
| 7 | 15 | 22(29) |
| 8 | 15 | 22(29) |
| 9 | 15 | 22(29) |
| 10 | 15 | 22(29) |
| 11 | 15 | 22(29) |
| 12 | 15 | 22(29) |
| 13 | 15 | 22(29) |
| 14 | | |
| 15 | | |
| 16 | | |

AUTOMATIC ELECTRONIC SEWING MACHINE

BACKGROUND OF THE INVENTION

The present invention relates to an automatic electronic sewing machine and, more particularly, to a digital control system of an electronic sewing machine which can automatically form various stitch patterns.

A typical control system of an electronic sewing machine is disclosed in John W. Wurst, U.S. Pat. No. 3,855,956 "SEWING MACHINE STITCH PATTERN GENERATION FROM STITCH DATA STORED IN STATIC MEMORY", patented on Dec. 24, 1974.

In this prior art system, digital information relates to the positional coordinates for each stitch of a predetermined stitch pattern is stored in a read only memory (ROM). The digital information stored in the ROM is applied directly to a driving means for controlling movement of stitch forming instrumentality of the sewing machine. Since the ROM output is applied directly to the driving means, the packaging of the ROM-IC should be the socket type to allow the exchange of the ROM when various stitch patterns are desired to be formed. However, this is not favorable in the sewing machine, because oscillation caused by the stitch forming instrumentality will produce ill connection between the ROM and the control circuit assembly.

OBJECTS AND SUMMARY OF THE INVENTION

Accordingly, an object of the present invention is to provide a novel control system for generating a stitch pattern in an electronic sewing machine.

Another object of the present invention is to provide a stitch pattern forming control system for an electronic sewing machine, which can automatically form various kinds of stitch patterns.

Still another object of the present invention is to provide a stitch pattern forming control circuit implemented by a large-scale integrated circuit (LSI).

Yet another object of the present invention is to provide a stitch pattern forming control system mainly comprising a read only memory (ROM) and a random access memory (RAM).

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a read only memory (ROM) is provided for storing digital information related to stitch patterns and control instructions for stitch formation purposes. A keyboard means is provided for selecting a desired stitch pattern and control instruction stored in the ROM. Selected digital information is introduced into a random access memory (RAM) and temporarily stored therein. The RAM develops control signals for controlling the needle position and the work feed in accordance with the selected digital information, or, the stitch patterns information and the control instruction temporarily stored in the RAM. The thus developed control signals are applied to a needle position control mechanism and to a work feed control mechanism through digital-to-analogue converters.

Various kinds of stitch pattern information and various kinds of control instructions are stored in the ROM. And the desired stitch pattern and the desired operational sequence are selected through the keyboard means at operator's choice. In a preferred form, the electronic sewing machine is automatically placed in the normal straight stitch formation mode when a main power switch is closed.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIGS. 18, 19, 20(A), 20(B), 21, and 22 are charts showing digital data for forming various stitch patterns;

DESCRIPTION OF THE PREFERRED EMBODIMENTS

(I) Control Panel

Figure 1:
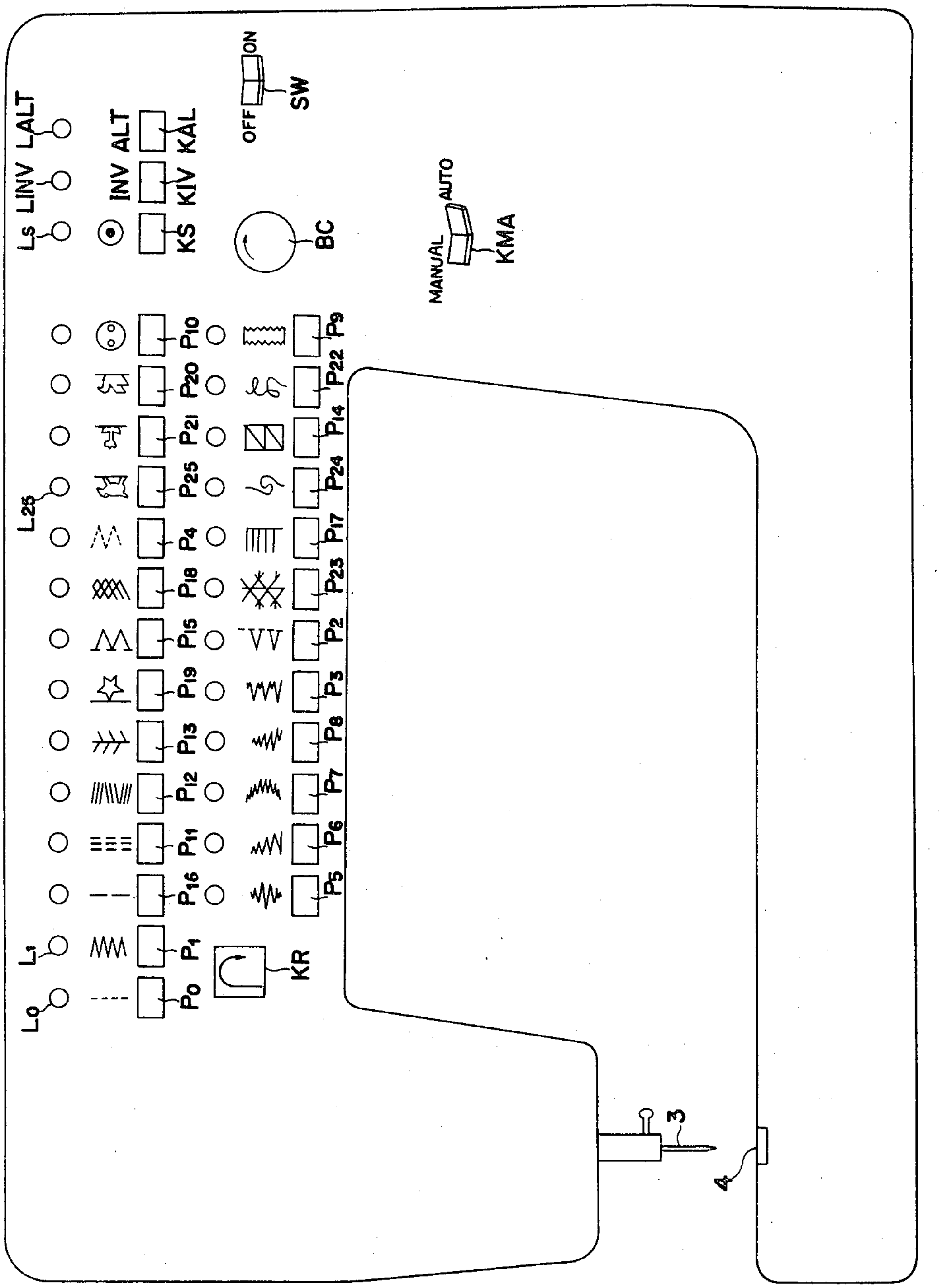
FIG. 1 is a schematic front view of an embodiment of an electronic sewing machine of the present invention.

FIG. 1 shows an embodiment of an electronic sewing machine of the present invention and, more specifically, shows a control panel of the electronic sewing machine of the present invention.

Stitch pattern selection keys $P_0$ through $P_{25}$ are provided for selecting desired stitch patterns, and control instruction selection keys KS, KIV, KAL and KR are provided for selecting desired operation modes.

More specifically, the stitch pattern selection key $P_0$ is for selecting a straight stitch pattern, $P_1$ is for a zigzag stitch pattern, $P_2$ is for a blind stitch pattern, $P_3$ is for a stretch blind stitch pattern, $P_4$ is for a mending stitch pattern, $P_5$ is for a bead stitch pattern, $P_6$ is for a satin stitch pattern, $P_7$ is for a scallop stitch pattern, $P_8$ is for an arrowhead stitch pattern, $P_9$ is for a buttonhole pattern, $P_{10}$ is for buttons, $P_{11}$ is for a stretch straight stitch pattern, $P_{12}$ is for a ricrac stitch pattern, $P_{13}$ is for a feather stitch pattern, $P_{14}$ is for a turkey stitch pattern, $P_{15}$ is for a stretch overlock pattern, $P_{16}$ is for a basting stitch, $P_{17}$ is for a lingerie stitch pattern, $P_{18}$ is for a honeycomb stitch pattern, $P_{19}$ is for a star stitch pattern, $P_{20}$ is for a dusk stitch pattern, $P_{21}$ is for a tulip stitch pattern, $P_{22}$ is for a leaf stitch pattern, $P_{23}$ is for a smocking stitch pattern, $P_{24}$ is for a surf stitch pattern, and the stitch pattern selection key $P_{25}$ is for selecting a dog stitch pattern.

The control instruction key KS functions to select a single stitch formation mode, the control instruction selection key KIV functions to select an inverse stitch formation mode wherein the stitch pattern is rotated by 180°, the control instruction selection key KAL functions to select an alternating stitch formation mode wherein two kinds of stitch patterns are alternatively formed, and the control instruction selection key KR functions to select a reverse stitch formation mode wherein the same stitch pattern is superimposed after returning to the initial position in the straight stitch mode.

The control panel further includes a main power switch SW, a manual/auto selection switch KMA, and a balance control switch BC for determining a work feed pitch. Indication lamps $L_0$ through $L_{25}$ are provided above the stitch pattern selection keys $P_0$ through $P_{25}$ for indicating the selected stitch pattern, and indication lamps $L_s$, LINV, LALT are provided above the control instruction selection keys KS, KIV and KAL for indicating the selected operation mode. In FIG. 1, the reference numeral 3 represents a needle of the electronic sewing machine, and the reference numeral 4 represents a work feed plate.

(II) Mechanical Portion

Figures 2, 3:
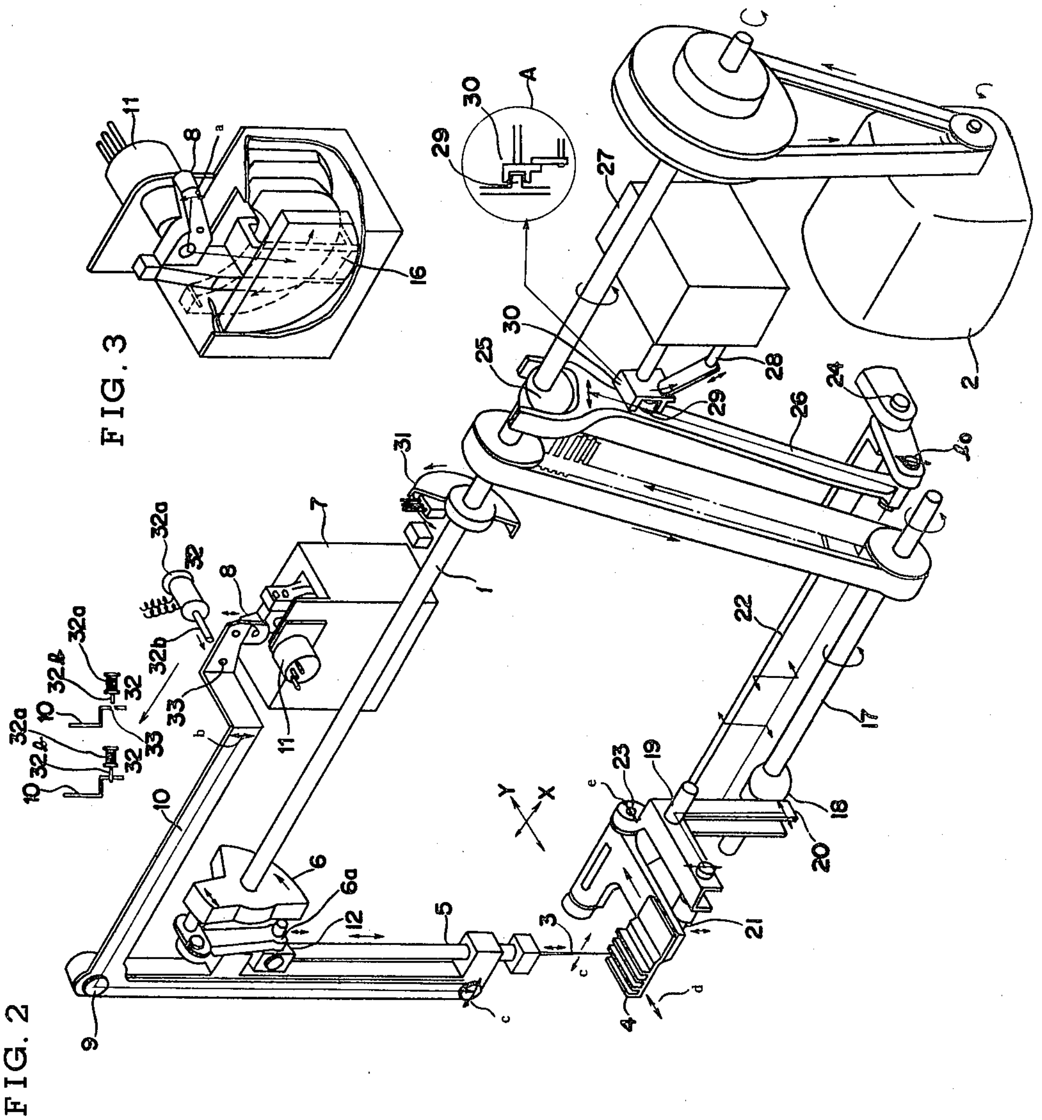
FIG. 2 is a perspective view of an essential part of a mechanical portion of the electronic sewing machine of the present invention.
FIG. 3 is a perspective view of a linear motor employed within the electronic sewing machine of the present invention.

FIG. 2 shows a mechanical portion of the electronic sewing machine of the present invention.

A main shaft 1 is driven to rotate by a motor 2. The needle 3 is driven to reciprocate through a needle shaft 5, and a crank shaft 6 associated with the main shaft 1.

A linear motor 7 is provided for positioning the needle 3 at a desired position through the needle shaft 5. An output arm 8 of the linear motor 7 is associated with one end of an L-shaped lever 10 which is rotatably supported around a pin 9. The other end of the L-shaped lever 10 is connected to the needle shaft 5.

When the output arm 8 of the linear motor 7 is rotated in the direction shown by the arrow a of FIG. 3, the L-shaped lever 10 is rotated around the pin 9 in the direction shown by the arrow b. With this rotation the position of the needle 3 is shifted along the X-axis as shown by the arrow c. The position of the needle 3 is detected by a potentiometer 11 which rotates in unison with the arm 8 of the linear motor 7.

Figure 4:
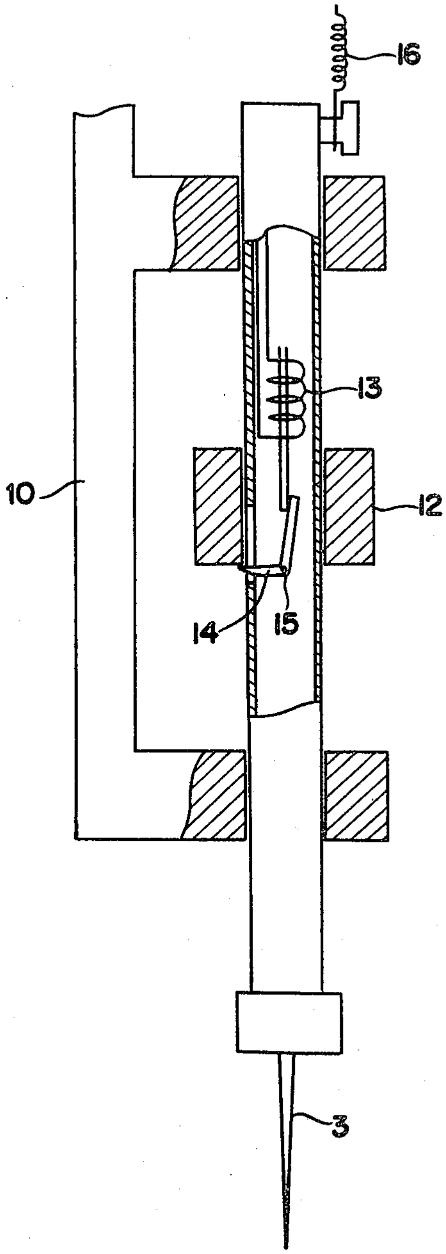
FIG. 4 is a partially sectional view of a needle penetration drive mechanism employed within the mechanical portion of FIG. 2, wherein a clutch is in the ON condition.
Figure 5:
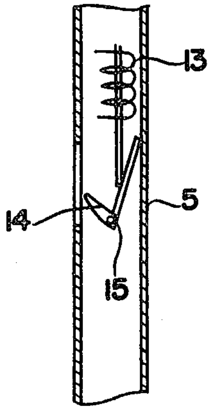
FIG. 5 is a sectional view of a clutch mechanism employed within the needle penetration drive mechanism of FIG. 4, wherein the clutch is in the OFF condition.
Figure 6:
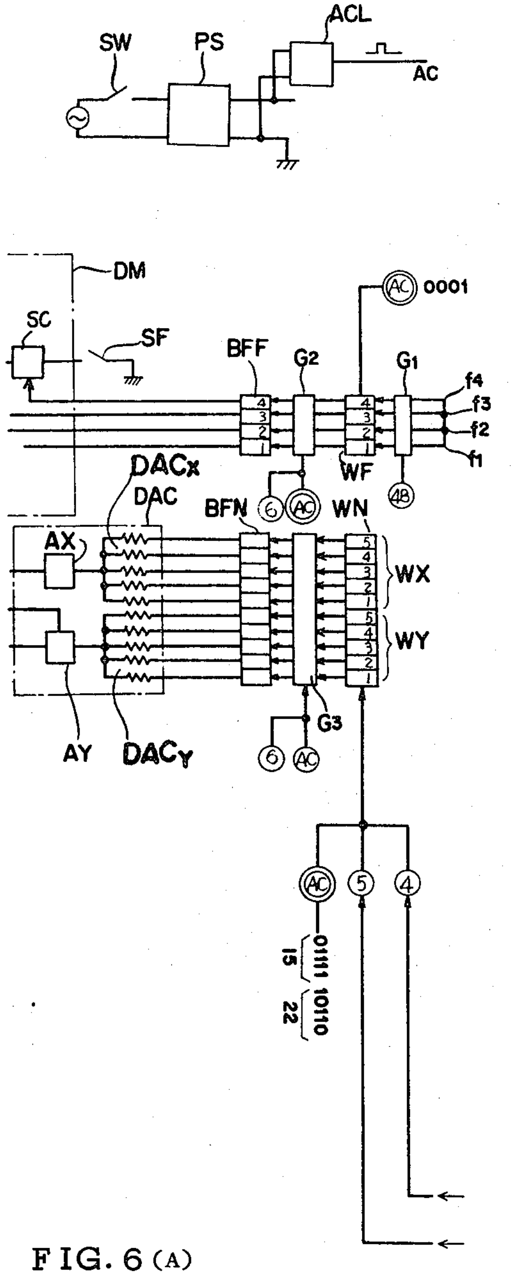
FIGS. 6(A) through 6(D) are block diagrams of an embodiment of a control system of an electronic sewing machine of the present invention.
Figure 6B:
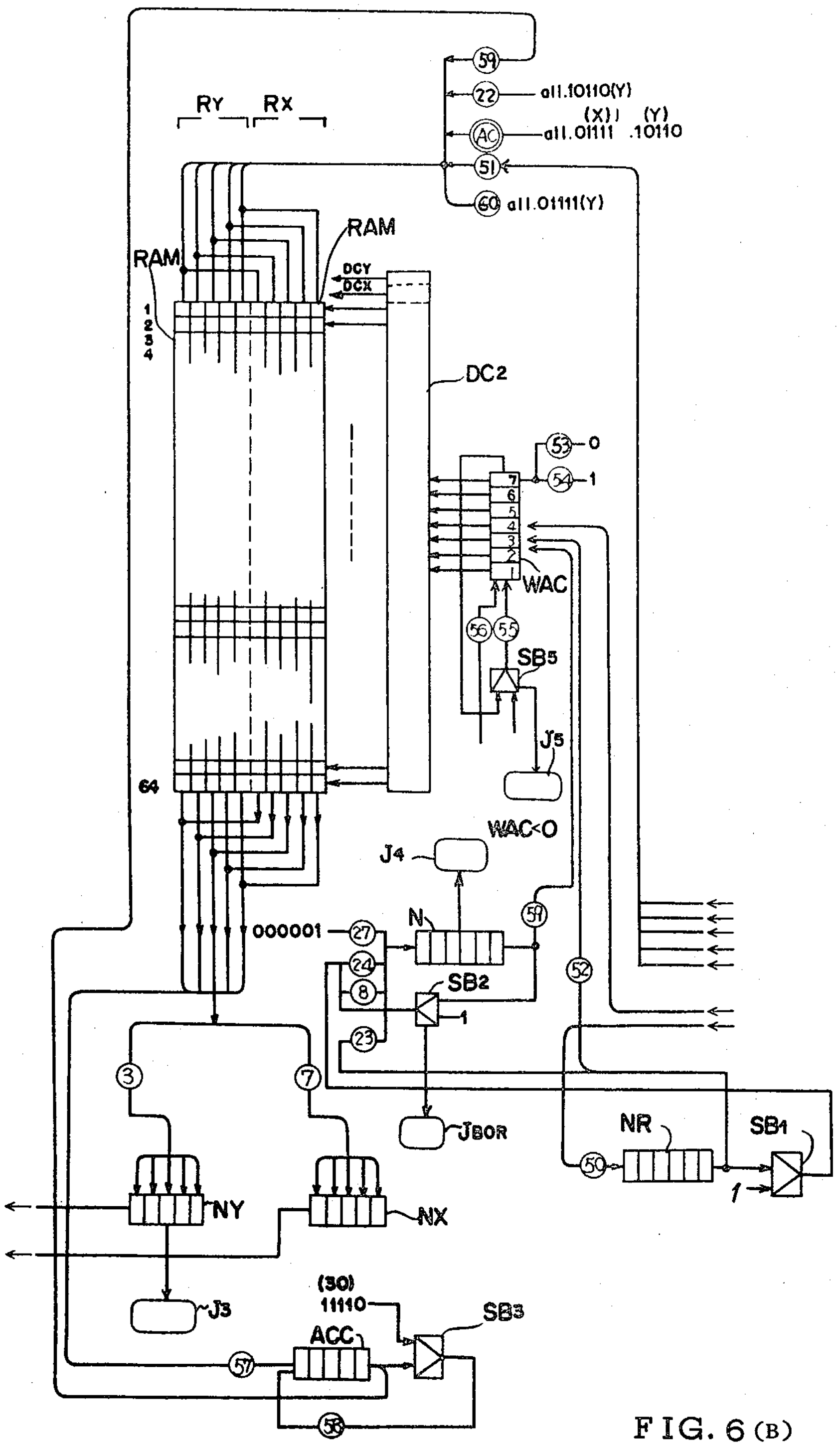
Figure 6:
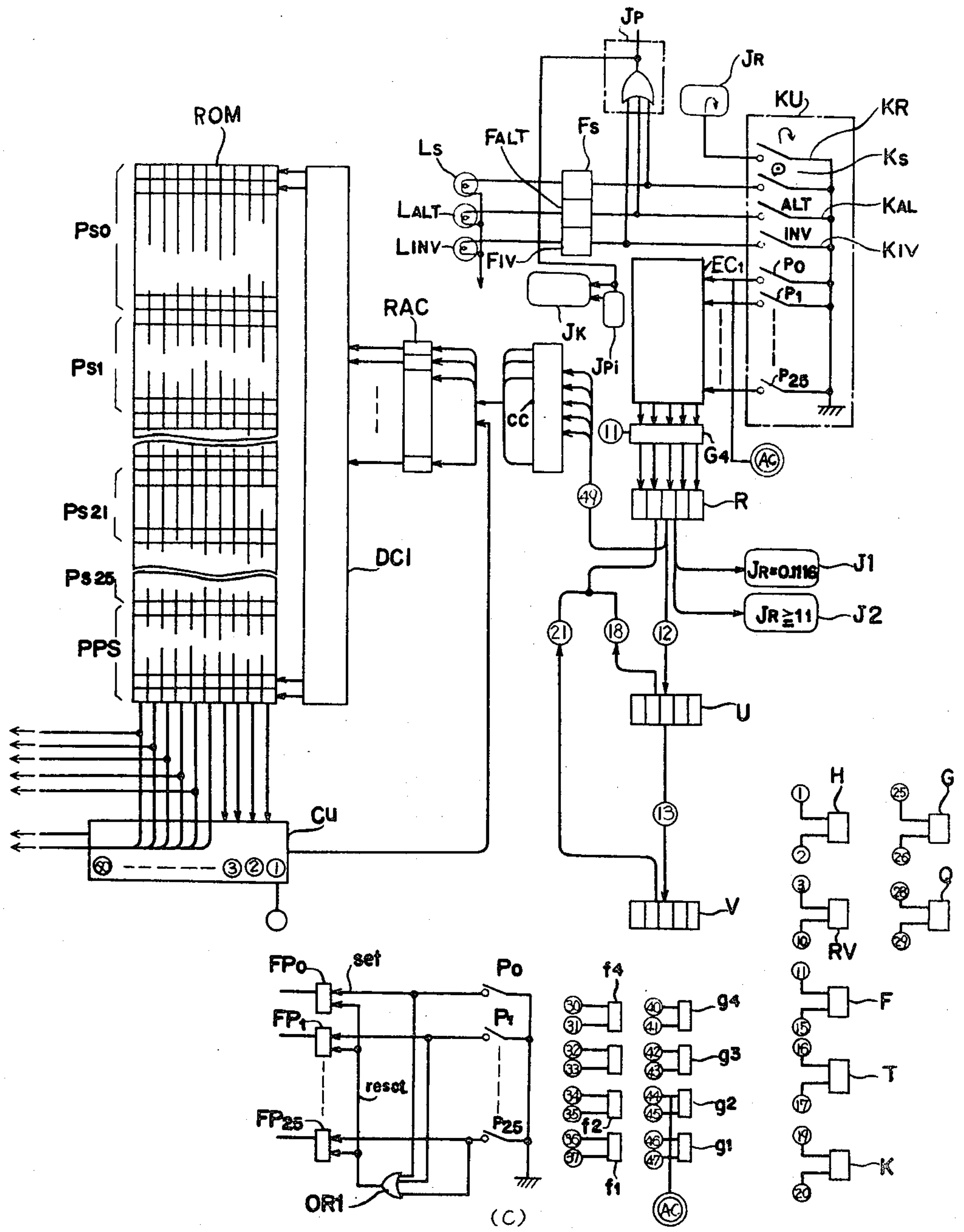
Figure 6:
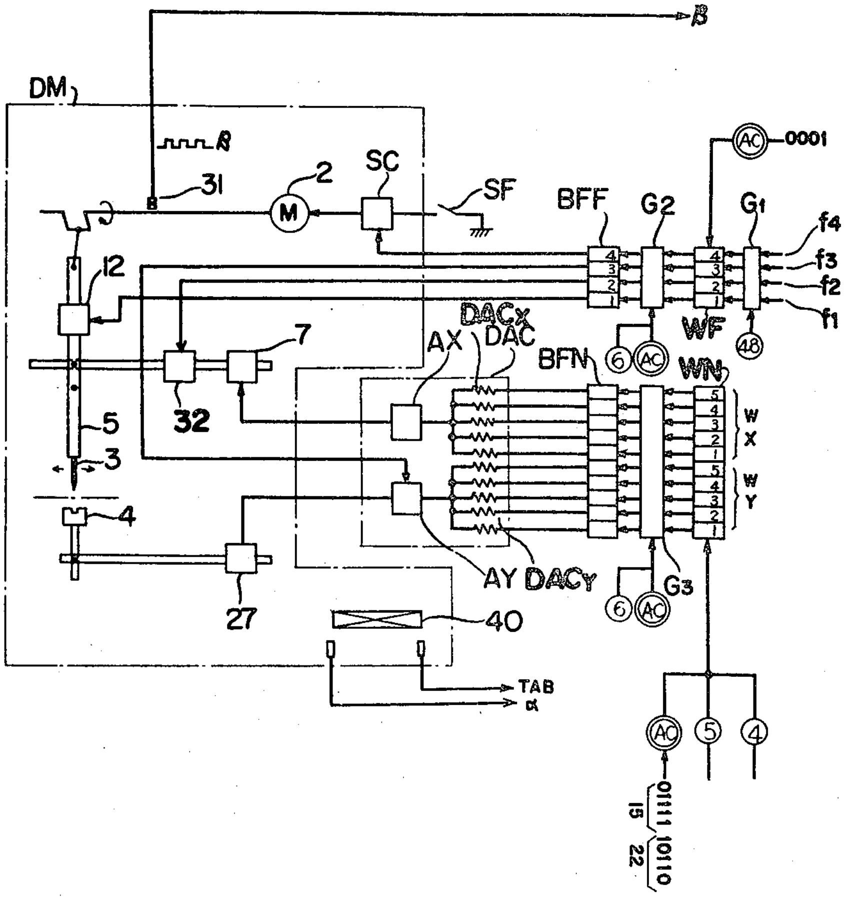

A clutch cylinder 12 is slidably secured around the needle shaft 5 as shown in FIGS. 4 and 5. A clutch solenoid 13 and a clutch click 14 are disposed within the needle shaft 5. The clutch click 14 is rotatably secured around a pin 15, and one end of the clutch click 14 can be extruded outside through the surface of the needle shaft 5. The clutch cylinder 12 is connected to an arm $6_a$ of the crank shaft 6.

When the clutch solenoid 13 is energized, the one end of the clutch click 14 is placed within the needle shaft 5 as shown in FIG. 5. The clutch click 14 is not engaged with the clutch cylinder 12 and, therefore, the clutch cylinder 12 is reciprocated by the crank shaft 6 without transporting the reciprocating movement to the needle shaft 5. The needle shaft 5 is positioned at the uppermost position by a spring 16.

When the clutch solenoid 13 is deenergized, the one end of the clutch click 14 is extruded through the surface of the needle shaft 5 as shown in FIG. 4. The extruded end of the clutch click 14 is engaged with the bottom surface of the clutch cylinder 12, thereby reciprocating movement of the clutch cylinder 12 is transported to the needle shaft 5. The needle shaft 5 is driven to travel downward by the clutch cylinder 12, and driven to travel upward by the spring 16. That is, when the clutch solenoid 13 is deenergized, the needle shaft 5 reciprocates in response to the rotation of the crank shaft 6. This condition is referred to as the condition where the clutch 12 is ON, hereinafter. Contrarily, when the clutch solenoid 13 is energized, the needle shaft 5 is stationary at its uppermost position without regard to the rotation of the crank shaft 6. This condition is referred to as the condition where the clutch 12 is OFF, hereinafter.

A work feed drive shaft 17 rotates in synchronization with the main shaft 1. A cam 18 is secured to the work feed drive shaft 17 for driving the work feed plate 4 to move downward and upward in synchronization with the rotation of the main shaft 1. The bottom surface of the work feed plate 4 is supported by an arm 21, which is communicated to the cam 18 via an L-shaped lever 20 which is rotatable around a pin 19.

An arm 22 is provided for shifting the location of the work feed plate 4 along the Y-axis, or, in the direction shown by the arrow d. One end of the arm 22 is communicated to a shaft 23 which rotatably supports the work feed plate 4, and the other end of the arm 22 is rotatably secured to a pin 24. The other end of the arm 22 is also rotatably communicated to an arm 26 which is engaged with a cam 25 fixed to the main shaft 1. A protrusion 29 is secured to the arm 26. The protrusion 29 is slidably associated with a C-shaped guide 30, which is rotatably connected to an output arm 28 of a linear motor 27 for determining the shift length of the work feed plate 4. The engaged condition of the protrusion 29 and the C-shaped guide 30 is shown in the circle A of FIG. 2.

When the groove of the C-shaped guide 30 is substantially parallel with the course of movement of the protrusion 29 which rotates around a fulcrum $l_o$, the position of the fulcrum $l_o$ is not changed even when the arm 26 changes its position in response to the rotation of the cam 25. When the C-shaped guide 30 is rotated by the linear motor 27 so that the groove of the C-shaped guide 30 crosses the course of movement of the protrusion 29 with a certain angle, the arm 26 is shifted its location in response to the rotation of the cam 25 in such a manner that the protrusion 29 is forced to accommodate the groove of the C-shaped guide 30.

Figure 7:
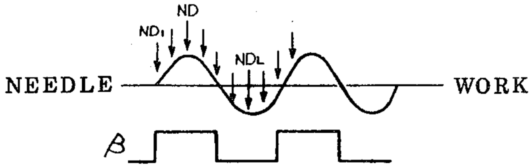
FIG. 7 is a chart showing a waveform of a synchronization signal $\beta$.

The shift operation of the arm 26 functions to rotate the arm 22 around the pin 24, whereby the shaft 23 is shifted its position in the direction shown by the arrow e by the length corresponding to the rotation value of the arm 22. In this way, the work feed plate 4 is shifted along the Y-axis by a desired length. The shift value is controlled by the linear motor 27 and the shift operation is synchronized with the rotation of the main shaft 1. The shift operation of the work feed plate 4 along the Y-axis is conducted when the work feed plate 4 is pushed upward by the arm 21. A synchronization signal generator 31 is fixed to the main shaft 1 so that a synchronization signal $\beta$ is developed in synchronization with the penetration operation of the needle 3 as shown in FIG. 7. When the clutch 12 is ON and the needle 3 is positioned above the work, the synchronization signal $\beta$ bears the high lever, or $\beta=1$. When the point of the needle 3 is positioned below the work, $\beta=0$. When the clutch 12 is OFF, the needle 3 is stationary at the uppermost position and the synchronization signal $\beta$ is developed in synchronization with the rotation of the main shaft 1.

A stopper 32 functions to lock the needle 3 at the center of the shift range of the needle 3 along the X-axis. The stopper 32 comprises a stationary solenoid 32*a* and a plunger 32*b*. The plunger 32*b* is inserted into a hole 33 formed in the lever 10 in order to lock the lever 10 at a predetermined position. Therefore, the needle 3 is locked at the center of the shift range of the needle 3 when the plunger 32*b* is inserted into the hole 33.

The stitches are formed by the penetration operation of the needle 3 as in the case of the conventional sewing machine. The stitch formation speed is controllable by the depression force applied to a foot switch as in the case of the conventional sewing machine.

(III) Summary of Control System

FIGS. 6(A) through 6(D) show an embodiment of a control system of the present invention.

DM is the above-discussed mechanical portion of the electronic sewing machine. The control system is made of an LSI (large scale integrated circuit). A read only memory ROM stores digital information related to stitch patterns and control instructions. A desired stitch pattern and a desired operation mode are selected through the stitch pattern selection key $P_0$ through $P_{25}$ and the control instruction selection keys KS, KIV, KAL and KR. The selected digital information is introduced into and stored in a random access memory RAM.

Figure 16:
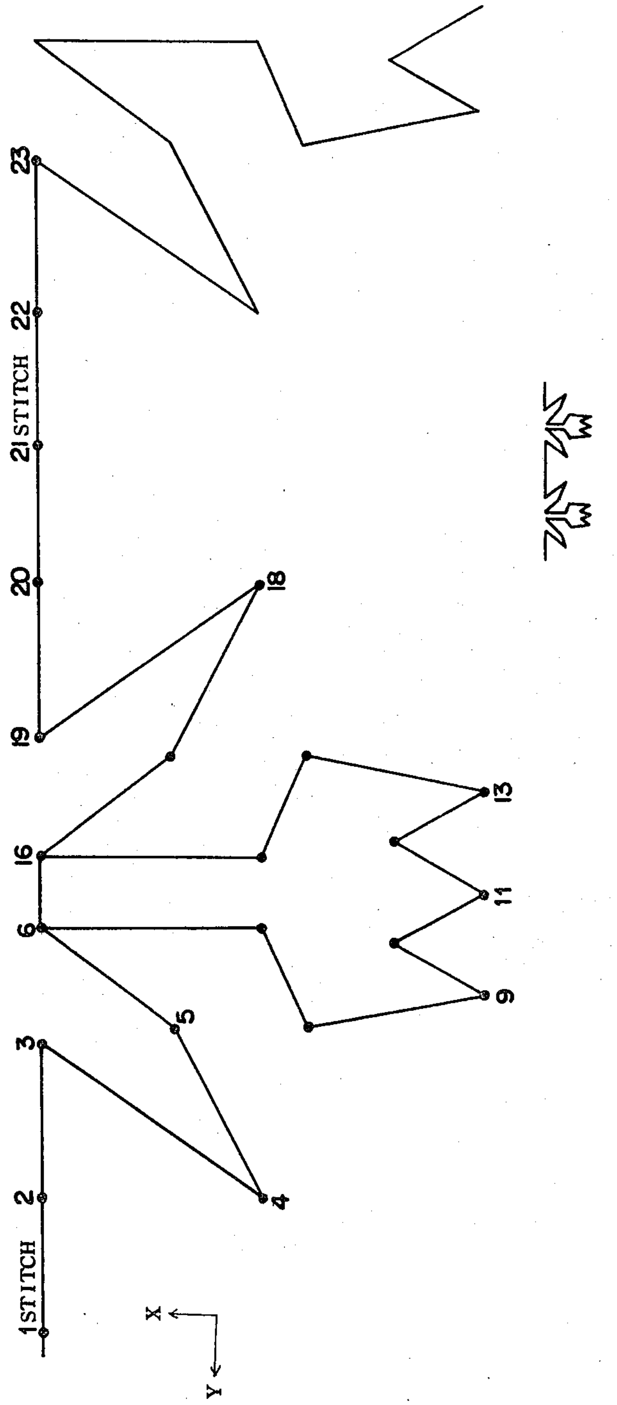
FIG. 16 is a chart of a tulip stitch pattern.
Figure 17:
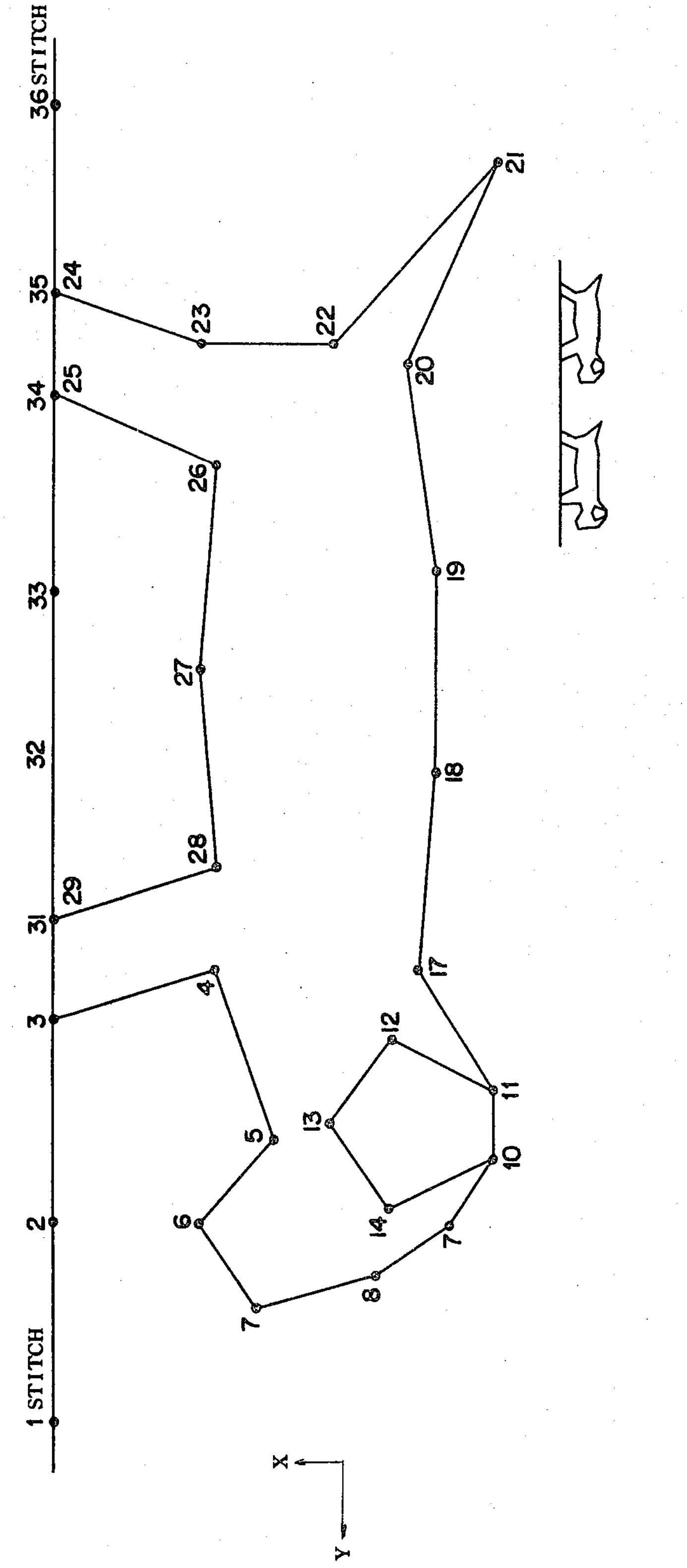
FIG. 17 is a chart of a dog stitch pattern.

The stitch pattern data correspond to the stitch pattern selected by the stitch pattern selection keys $P_0$ through $P_{25}$. For example, when the stitch pattern selection key $P_{21}$ is operated, the digital information relates to a tulip pattern as shown in FIG. 16 is introduced into the random access memory RAM. The pattern data indicate the positioning coordinates of the respective stitches along the X-axis and the Y-axis. FIG. 18 shows digital coordinates of the respective stitches of the tulip pattern. The X section represents the positioning coordinates of the needle 3, and the Y section represents feed values of the work feed plate 4. The pattern data stored in the RAM are developed step by step in synchronization with the synchronization signal $\beta$ and converted into analog signals for shifting the needle 3 and the work feed plate 4 for achieving the stitch formation at predetermined positions.

The shift operation of the needle 3 and the work feed plate 4 is conducted when the needle 3 is separated from the work. The ROM stores programm commands for conducting the programm shown in FIGS. 9(A) through 9(D), and 10 through 12. A portion of output signals of the ROM is applied to various portions of the control circuit as micro-orders (1) through (60). In FIGS. 6(A) through 6(D), portions represented by the micro-orders (1) through (60) receive signals when the corresponding micro-orders (1) through (60) are developed. The respective micro-orders (1) through (60) are developed at the respective steps of the programme as shown in FIGS. 9(A) through 9(D), and 10 through 12.

(IV) Stitch Coordinates

Figure 13:
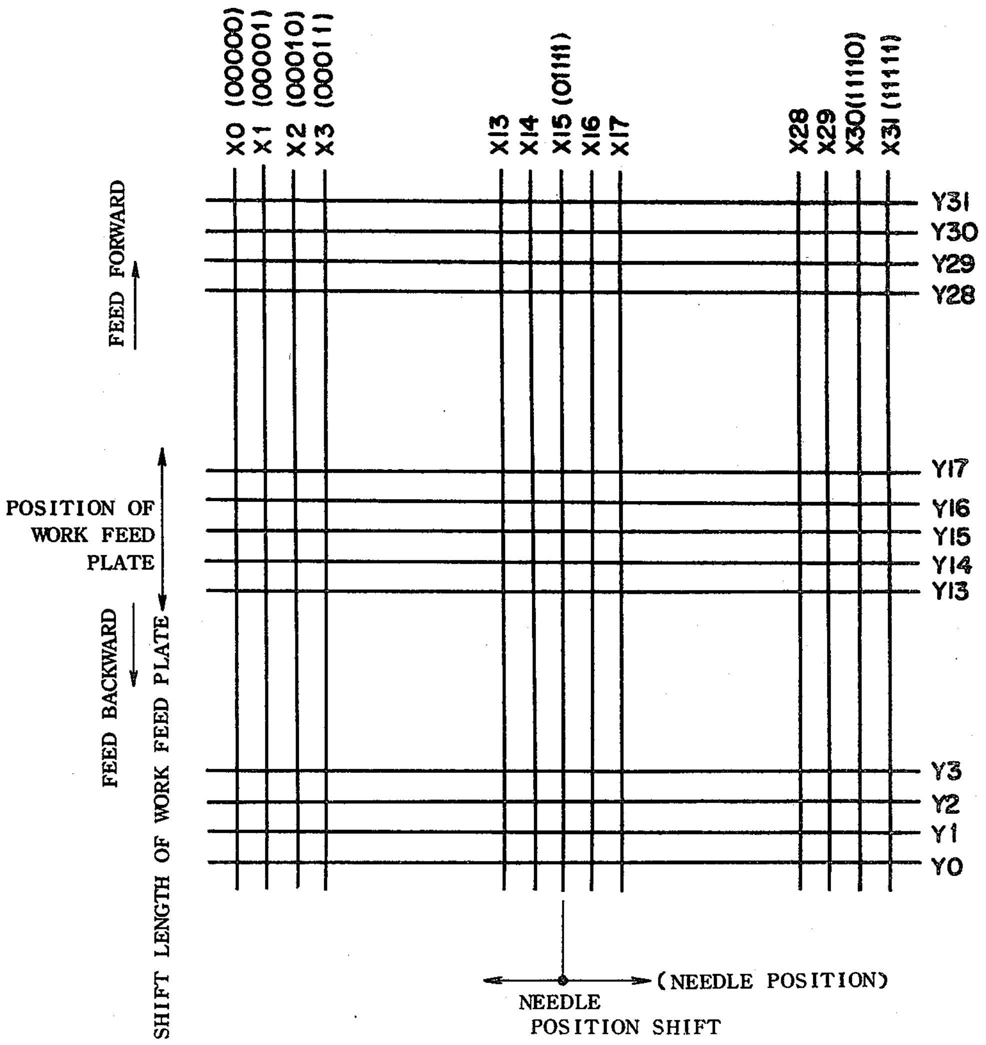
FIG. 13 is a chart showing coordinates of a needle position and a work feed plate position.

The needle position can be selected from thirty-two (32) positions $X_0$ through $X_{31}$, and the work position can be selected from thirty-two (32) positions $Y_0$ through $Y_{31}$. That is, the stitch pattern can be formed in a matrix of 32×32 as shown in FIG. 13.

More specifically, the RAM stores the positioning information in the following manner.

| X COORDINATES | NEEDLE POSITION | RAM DATA |
|---|---|---|
| $X_0$ | maximum shift in the positive direction | 00000 |
| . | . | . |
| . | . | . |
| . | . | . |
| . | . | . |
| $X_{15}$ | center | 01111 |
| . | . | . |
| . | . | . |
| . | . | . |
| $X_{31}$ | maximum shift in the negative direction | 11111 |

| Y COORDINATES | WORK FEED PLATE POSITION | RAM DATA |
|---|---|---|
| $Y_0$ | maximum feed in the negative direction | 00000 |
| . | . | . |
| . | . | . |
| . | . | . |
| . | . | . |
| $Y_{15}$ | center | 01111 |
| . | . | . |
| . | . | . |
| . | . | . |
| $Y_{31}$ | maximum feed in the | 11111 |

-continued

| |
|---|
| positive direction |

(V) Construction of Control System

Figure 8:
FIG. 8 is a chart showing relationships between stitch patterns and key codes.
Figure 8:
Figure 8:
Figure 8:
Figure 8:
Figure 8:
Figure 8:
Figure 8:
Figure 8:
Figure 8:
Figure 8:
Figure 8:
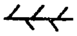
Figure 8:
Figure 8:
Figure 8:
Figure 8:
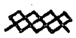
Figure 8:
Figure 8:
Figure 8:
Figure 8:
Figure 8:
Figure 8:
Figure 8:
Figure 9A:
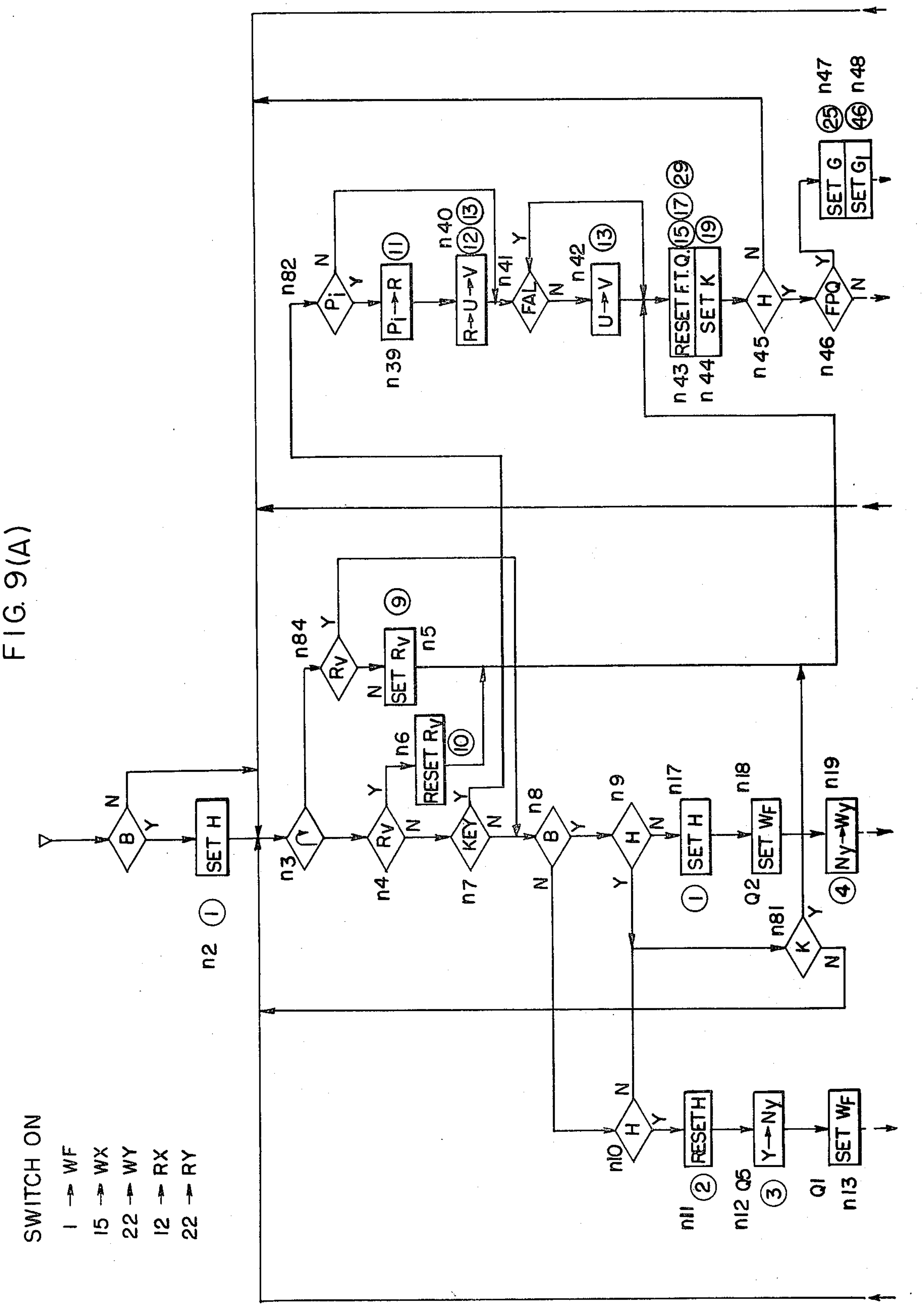
FIGS. 9(A) through 9(D) and 10 through 12 are programme charts for explaining operation of the control system of FIGS. 6(A) through 6(D)
Figure 9B:
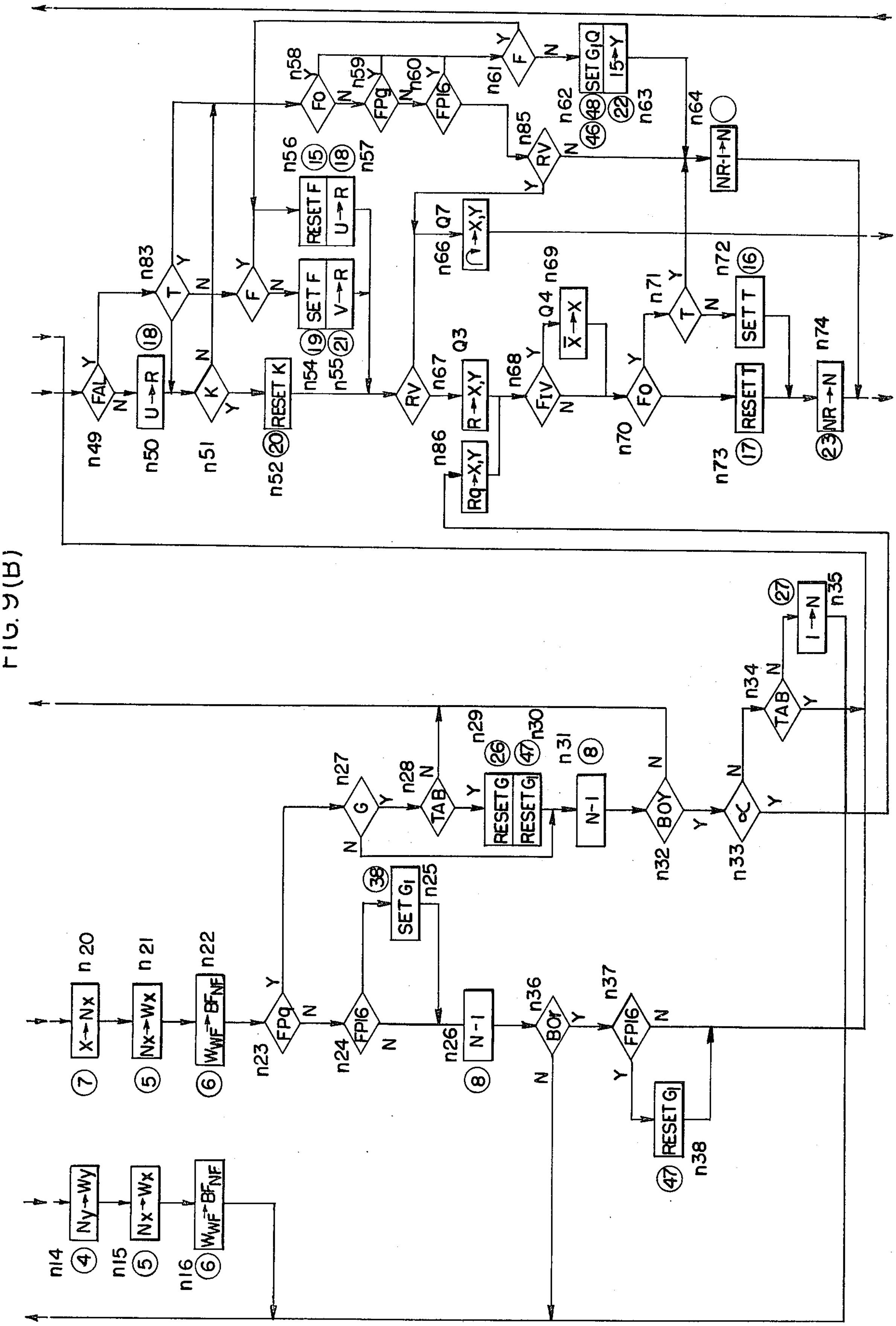
Figure 9C:
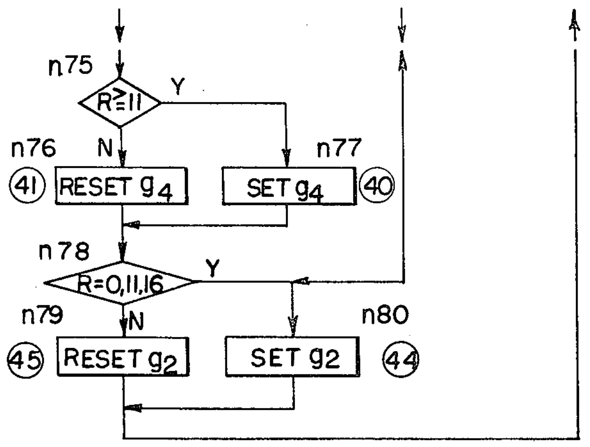
Figure 9:
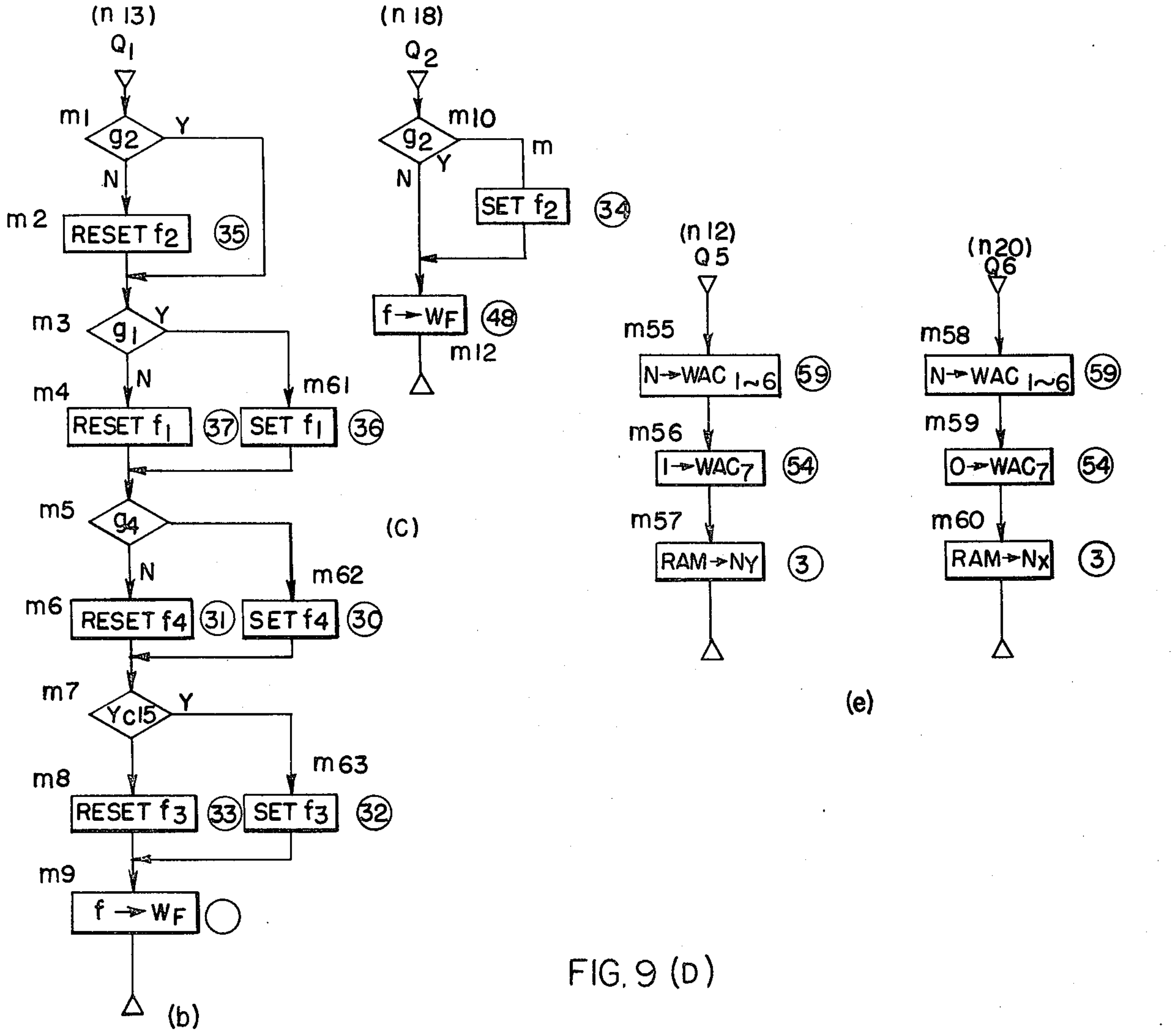

Referring again to FIGS. 6(A) through 6(D), the control system mainly comprises a key input unit KU including the stitch pattern selection keys $P_0$ through $P_{25}$ and the control instruction selection keys as shown in FIG. 1, and an encoder $EC_1$ for developing key code signals in response to the operation of any one of the stitch pattern selection keys $P_0$ through $P_{25}$. FIG. 8 shows an example of relationships between the stitch pattern selection keys $P_0$ through $P_{25}$ and the key code signals.

The control system further comprises registers R, U and V of five (5) bits for storing the key code signals, and detection circuits $J_1$ and $J_2$. The detection circuit $J_1$ functions to detect whether the contents of the register R are "0", "11" or "16". The contents "0" correspond to the depression of the straight stitch key $P_0$, the contents "11" correspond to the depression of the stretch straight stitch key $P_{11}$, and the contents "16" correspond to the depression of the basting stitch key $P_{16}$. The detection circuit $J_2$ functions to detect whether the contents of the register R are greater than "11".

A detection circuit JR detects the depression of the reverse key KR, and another detection circuit JP detects the depression of the single stitch formation instruction key KS, the alternating stitch formation instruction key KAL, or the inverted stitch formation instruction key KIV. T-type flip-flops FS, FALT and FIV are in the inverted condition upon depression of the instruction keys KS, KALT and KIV, respectively, and are reset at desired timings. A key depression detection circuit JK receives output signals of the detection circuit JP and the encoder $EC_1$ to detect the depression of any one of the keys included within the key input unit KU.

The read only memory ROM includes plural steps, each step comprising ten (10) bits. The read only memory ROM includes memory stages $PS_0$, $PS_1$, . . . , each stage storing the pattern data or the control instruction data.

Figure 32:
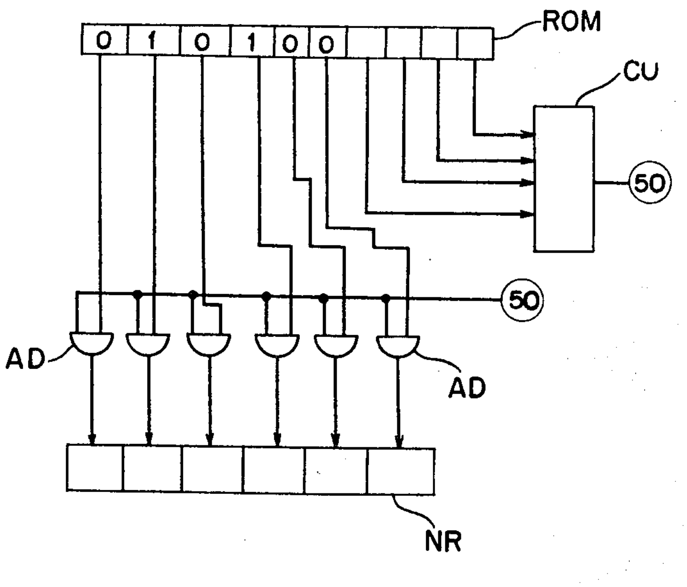
FIG. 32 is a circuit diagram of an example of a system for reading out information from an ROM.
Figure 33:
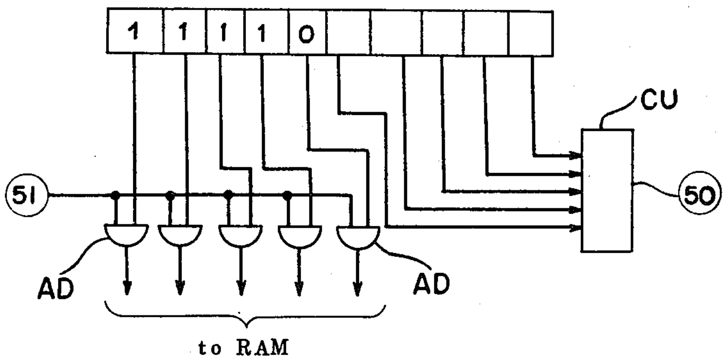
FIG. 33 is a circuit diagram of another example of the system for reading out information from the ROM.

Each step of the read only memory ROM stores the information related to the stitch number, the pattern data and the program control data. Read out operation can be achieved in such a manner as shown in FIGS. 32 and 33. That is, a portion of each step is read out for developing the stitch number data and the pattern data, and the remaining portion of each step is read out for developing the program control data to develop predetermined micro-orders.

A code converter CC develops address selection signals to the read only memory ROM in response to the key code signals derived from the register R. An address counter RAC receives the address selection signals derived from the code converter CC, and an address decoder $DC_1$ functions to convert the output signals of the address counter RAC to the address codes of the read only memory ROM. A control signal generator CU reads output codes of the read only memory ROM to develop various control signals such as the micro-orders (1) through (60).

A six (6) bit register NR stores the maximum stitch number of the stitch pattern stored in the read only memory ROM, for example, twenty-one (21) in case of the tulip pattern. A subtractor $SB_1$ functions to subtract one from the contents of the register NR. Operation of the subtractor $SB_1$ will be described later.

The random access memory RAM stores the pattern data of a stitch pattern selected by the stitch pattern selection keys $P_0$ through $P_{25}$ in accordance with the instruction commands stored in the read only memory ROM. Each stage of the random access memory RAM comprises ten (10) bits and includes an RX side for storing the X coordinates data of the stitch pattern and an RY side for storing the Y coordinates data of the stitch pattern. The number of stages of the random access memory RAM should be greater than the maximum stitch number of the stitch patterns, for example, thirty-seven (37) of the dog pattern. In this embodiment, the random access memory RAM includes sixty-four (64) stages.

The stage number of the random access memory RAM is preferably correlated with the address counter RAC. In this example, the stage number sixty-four (64) is derived from $2^n$, where $n=6$.

An address counter WAC is provided for addressing the random access memory RAM. The first through sixth bits $WAC_1$ through $WAC_6$ of the address counter WAC are provided for selecting the stages of the random access memory RAM, and the seventh bit $WAC_7$ of the address counter WAC is provided for selecting the RX side or the RY side. When the seventh bit $WAC_7$ is zero (0), the RX side is selected, and the RY side is selected when the seventh bit $WAC_7$ is one (1). A decoder $DC_2$ receives the output signals of the address counter WAC to address the random access memory RAM. An output DCX is developed from the decoder $DC_2$ to select the RX side when the contents of the seventh bit $WAC_7$ are zero (0), and another output DCY is developed from the decoder $DC_2$ to select the RY side when the contents of the seventh bit $WAC_7$ are one (1).

A six bit register N receives the contents of the register NR in the single pattern formation mode, and receives the contents of the subtractor $SB_1$ after second pattern in the continuous pattern formation mode, the contents being stored in the register N. The thus stored contents of the register N are applied to a subtractor $SB_2$ which functions to subtract one (1) from the contents of the register N upon completion of one stitch formation. The contents of the register N are applied to the address counter WAC for addressing the following stitch. A detection circuit JBOR functions to detect the occurrance of borrow within the subtractor $SB_2$, the borrow operation occurring when the contents of the register N become smaller than zero (0). That is, the detection circuit JBOR detects the completion of formation of one stitch pattern.

Registers NY and NX store the data of one stitch derived from the RY side and the RX side of the random access memory RAM, respectively. The contents of the registers NY and NX are transported to a Y side WY and an X side WX of a positioning register WN, respectively.

A detection circuit $J_3$ detects whether the contents of the register NY are below fifteen (15), that is, whether the work feed plate 4 is shifted in the negative direction. An output signal of the detection circuit $J_3$ is used for the balance control purposes, which will be described later. A detection circuit $J_4$ detects whether the contents of the register N are zero (0), and another detection circuit $J_5$ detects whether the contents of the address counter WAC are zero (0). A subtractor $SB_5$ functions to subtract one (1) from the contents of the address counter WAC.

A five (5) bit accumulator ACC is provided for developing the pattern data in the inverted pattern formation mode. The accomolator ACC receives the data from the RX side of the random access memory RAM, and develops output signals to a subtractor $SB_3$. The subtractor $SB_3$ functions to perform calculation 30-ACC, thereby developing the inverted pattern data. Detailed operation of the inversion will be described later.

RS flip-flops $f_1$ through $f_4$, $g_1$ through $g_4$, H, G, RV, Q, F, T and K are provided for detecting the control condition of the ROM programme shown in FIGS. 9(A) through 9(D). The respective RS flip-flops are connected to receive the micro-orders at their set input terminals and at their reset input terminals.

Set priority type RSS flip-flops $FP_0$ through $FP_{25}$ are associated with the pattern selection keys $P_0$ through $P_{25}$, respectively. The respective RSS flip-flops $FP_0$ through $FP_{25}$ are set when the corresponding pattern selection keys $P_0$ through $P_{25}$ are depressed, and are reset when the pattern selection keys not corresponding to the RSS flip-flops are depressed.

An auto clear signal generator ACL develops an auto clear signal AC of a predetermined pulse width when a main power switch SW is closed. PS is a power unit for supplying a predetermined voltage or current to various portions of the electronic sewing machine. The auto clear signal AC functions to set the initial condition of the control circuit.

A buffer register BFN temporarily stores the contents derived from the register WN, and a digital-to-analog converter DAC converts the digital data stored in the buffer register BFN into analogue signals related to X and Y coordinates. Amplifiers AY and AX amplify the output signals of the digital-to-analog converter DAC. The amplifier AY develops output signals to the linear motor 27 for controlling the shift value of the work feed plate 4. The amplifier AX develops output signals to the linear motor 7 for controlling the position of the needle 3.

A four (4) bit register WF receives a control signal for controlling the ON/OFF operation of the clutch 12 at its first bit, a control signal for controlling the ON/OFF operation of the stopper 32 at its second bit, a balance control signal at its third bit, and a speed control signal at its fourth bit. A buffer register BFF temporarily stores the output signals of the respective bits of the register WF.

Gate circuits $G_1$ through $G_4$ are responsive to the micro-orders shown in the drawings and to the auto clear signal AC. The input signals applied to the gate circuit $G_1$ are the output signals of the flip-flops $f_1$ through $f_4$. FS is the foot switch, and SC is a speed control circuit for controlling the rotation velocity of the motor 2.

The respective stages $PS_0$ through $PS_{25}$ and PPS of the read only memory ROM store the pattern information and the control instructions in the following manner.

| STAGE | DATA |
|---|---|
| $PS_0$ | straight stitch $P_0$ |
| $PS_1$ | zigzag stitch $P_1$ |
| $PS_2$ | blind stitch $P_2$ |
| . | . |

-continued

| STAGE | DATA |
|---|---|
| . | . |
| . | . |
| $PS_{24}$ | surf stitch $P_{24}$ |
| $PS_{25}$ | dog stitch $P_{25}$ |
| PPS | instruction commands |

The respective stages automatically develop the pattern data and the instruction commands to be applied to the random access memory RAM in accordance with the program shown in FIGS. 9(A) through 9(D) when the first address of the stage is selected.

When the selected stitch pattern has the stitch number SN, the random access memory RAM stores the positioning data of the first stitch at the SNth stage, and the positioning data of the second stitch at the (SN−1)th stage. And the positioning data of the last, or, the SNth stitch are stored at the first stage of the random access memory RAM.

Operation mode of the control system will be described with reference to the program charts of FIGS. 9(A) through 9(D) and FIGS. 10 through 12.

(VI) Auto Clear

When the main power switch SW is closed, a signal 0001 is introduced into the register WF and transported to the buffer register BFF via the gate circuit $G_2$. The first bit signal "1" of the buffer register BFF is applied to the clutch 12 to turn OFF the clutch 12, whereby the needle 3 is held stationary at its uppermost position.

At the same time a signal "01111", or, fifteen (15) is applied to the register WX, and a signal "10110", or, twenty-two (22) is applied to the register WY. These signals are applied to the digital-to-analogue converter DAC through the gate circuit $G_3$ and the buffer register BFN to place the needle 3 at its center position and set the work feed value at +7. This is the straight stitch formation mode.

The above-mentioned data signals "01111" and "10110" are introduced into the random access memory RAM when the seventh stage of the address counter WAC is made zero (0) and the signal DCX is derived from the decoder $DC_2$ to select the RX side and, therefore, the input data "01111" are applied to the first through sixty-fourth (64th) steps. The data signal "10110" are introduced into the RY side in the same manner.

The flip-flop g2 is set by the auto clear signal AC. The step m10 of the step n18 detects the flip-flop g2 to set the flip-flop f2 when the flip-flop g2 is "1". At the following step m12, the contents "1" of the flip-flop f2 are transported to the second stage of the register WF, whereby the second stage of the buffer register BFF is set to "1" via the gate circuit $G_2$. The signal "1" of the second stage of the buffer register BFF drives the stopper 32 to fix the needle 3 at its center position.

(VII) Condition Immediately After Auto Clear

(VII-1) When Foot Switch Is Not Actuated

When the main shaft is held at the condition where $\beta=1$, the flip-flop H is set. The condition shifts in the following manner.

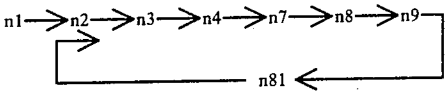

(PROGRAM A)

The program A is repeated while $\beta=1$, whereby the contents stored in the random access memory RAM are not read out while the electronic sewing machine does not perform the stitch formation. That is, the operation is not forwarded to the X coordinates set program.

When the main shaft is held at the condition where $\beta=0$, another program B is repeated while $\beta=0$, whereby the contents stored in the random access memory RAM are not read out. The operation is not forwarded to the Y coordinates set program.

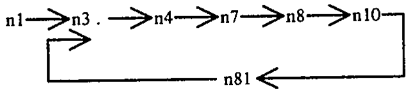

(PROGRAM B)

(VII-2) When Foot Switch SF Is Actuated

The needle shaft 5 and the needle 3 are driven to move downward and upward by the motor 2 through the main shaft 1 and the crank lever 6. The synchronization signal $\beta$ changes its state between "0" and "1" in response to the position of the needle 3.

(VII-3) When $\beta$ Is Changed From "1" To "0"

At the step n8 of the program A, $\beta=0$ is detected. The programme is advanced to the step n10 and the step n11 since the flip-flop H is set. At the step n11, the flip-flop H is reset, whereby the Y coordinates set program is conducted. The operation is performed in a manner, n12→n13→n14→n15→n16 . . . , whereby the Y side data of the random access memory RAM are transported to the register NY. The program is returned to the step n3 from the step n16.

Thereafter, the following program is maintained while $\beta=0$.

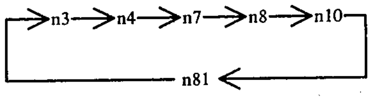

The flip-flop $f_1$ is reset at m4 of n13, and the contents of the flip-flop $f_1$ are transported to the first bit of the register WF at m9. The contents of the register WF are transported to the buffer register BFF at n22 to turn OFF the clutch 12. Therefore, the stitch formation is not conducted when $\beta=0$.

Thereafter, when the synchronization signal $\beta$ becomes one (1), the program is advanced from n8 to n9. The flip-flop H is set at n17, and the program is advanced in the following manner to set the X coordinates.

n18→n19→n20→n21→n22

In the case when the foot switch SF is continuously actuated, the clutch 12 is turned ON, whereby the first stitch is formed.

(VII-4) When $\beta$ Is Changed From "0" To "1"

The program is advanced from the step n8 to the step n9 since $\beta=1$. Since the flip-flop H is initially reset, the program is advanced to the step n17 to set the flip-flop H. In this condition, the program is advanced to the X coordinates set program. After completion of the X coordinate setting, the program is returned to the step n3. When the synchronization signal $\beta$ is maintained one (1) at the step n3, the following program is repeated.

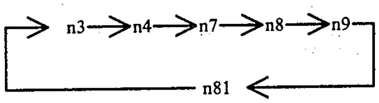

When the foot switch SF is continuously actuated, the synchronization signal is changed from "1" to "0" in response to the rotation of the main shaft 1. The program is advanced from the step n8 to the step n10, and to the Y coordinates set program n11 through n16 since the flip-flop H is set in advance. The flip-flop $f_1$ is reset at m4 of n13 to turn OFF the clutch 12 at n16. Thereafter, when the synchronization signal $\beta$ is changed from "0" to "1", the program is advanced in the manner, n8→n9→n17, to set the X coordinates.

The first stitch is formed when the clutch 12 is turned ON upon the following invertion of the synchronization signal $\beta$ from "1" to "0".

When the needle is positioned above the work at the time immediately before the foot switch is actuated, the operation is conducted in the following manner.

(1) set the X coordinates
(2) set the Y coordinates
(3) set the X coordinates
(4) form the first stitch through the use of the set values determined by the above steps (2) and (3).

As already discussed above, the information "1" is introduced into the register WF at the auto clear operation to set OFF the clutch 12. However, the flip-flop $f_1$ is reset at m4 since the flip-flop $g_1$ is "0" immediately after the main power switch is closed. The detection of the flip-flop $g_1$ is conducted at m3 of n13 (see the program chart $Q_1$). The contents of the flip-flops $f_1$ through $f_4$ are transported to the register WF at m9, and the contents of the register WF are transported to the buffer register BFF at the following n16. In this way, the first stage of the buffer register BFF is changed from "1" to "0". Therefore, the clutch 12 is set ON and the straight stitch formation is conducted in response to the actuation of the foot switch.

In the straight stitch formation mode following the main power switch closing, the programme is advanced in the following way after completion of the X coordinates setting at n22.

n23→n24→n26

Since the contents of the register N are cleared to zero (0) at the auto clear operation, the borrow operation occurs when the subtraction of one (1) is conducted from the contents of the register N. Therefore, the program is advanced from n36 to n37. Thereafter, the program is advanced to n64 after passing the following steps.

n49→n50→n51→n52→n59→n60

Since the contents of the register NR are also zero (0), the contents of the register NR become 11111 upon the subtraction operation. Thereafter, the program is advanced to n3 after passing the following steps.

n75→n76→n78→n80

The straight stitch formation is not influenced at all. At the following cycle, when the programme is advanced to n26, the program is advanced from n36 to n3 because $N \neq 0$ ($N = 11111$ at n64).

The above-mentioned cycle is repeated till the borrow operation occurs when the information one (1) is subtracted from the contents of the register N. The straight stitch formation is continuously performed without regard to the facts whether the program is returned to n3 from n36 or n37.

(VIII) Pattern Stitch

By way of example, a tulip pattern shown in FIG. 16 will be described.

When the tulip pattern selection key $P_{21}$ is actuated, the code signal "11000" is developed from the encoder $EC_1$. The detection circuit JK detects the key depression.

The program is constructed so as to return to n3 upon every completion of one stitch. Therefore, the program is always passes step n7. When any one of the keys is depressed, the depression is detected at the step n7 and the program is skipped to the step n82, where the depression of a certain key $P_i$ is detected. Thereafter the program is advanced to n39 to develop the micro-order (11) from the control signal generator CU. Upon generation of the micro-order (11), the code signal "11000" is introduced into the register R through the gate circuit $G_4$. Thereafter, the micro-orders (12) and (13) are developed to introduce the contents "11000" of the register R into the registers U and V, respectively. The contents "11000" are sustained in the register R.

Since the alternating stitch formation command key KAL is not actuated, the flip-flop FALT is "0" and, therefore, the program is advanced to the step n42 to introduce the contents of the register U into the register V by the micro-order (13).

At the following step n44, the flip-flop K is set, and the detection for the flip-flop H is conducted at the step n45.

The pattern data are introduced from the read only memory ROM to the random access memory RAM when the flip-flop H is in the set condition. In this way, the pattern data are firstly introduced into the random access memory RAM and, thereafter, the positioning is conducted to the Y coordinates.

When the flip-flop H is "0" at n45, the following program is repeated.

n43→n44→n45→n3→n4→n7→n8→n10→n81

When the synchronization signal $\beta$ becomes "1", the program is advanced in the following way to set the flip-flop H, thereby conducting the setting of the X coordinates.

n8→n9→n17

At this moment, the set contents related to the X-axis are the pattern information of the foregoing operation. The setting of the X coordinates is completed by the operation to the step n22 and, thereafter, the program is advanced in the following manner.

n23→n24→n26

When the pattern formation of the foregoing pattern is not completed, the program is returned from n36 to n3. Then, the programme is advanced in the following manner since the flip-flop H is "1".

n3→n4→n7→n8→n9→n81→n43→n44→n45→n46-→n49→n50

At the following step n51, since $K = 1$, the program is advanced to the step n52 to set the flip-flop K. Since the reverse key depression detection circuit $RV = 0$, the program is advanced from n65 to n67. At the step n67, the pattern data of the tulip pattern are introduced in accordance with the program $Q_3$ shown in FIG. 10.

In the program $Q_3$, the micro-order (49) is developed at the step m13. The key code signal "11000" of the tulip pattern key $P_{21}$ is applied from the register R to the address counter RAC through the code converter CC, whereby the first address of the stage $PS_{21}$ is selected.

Now assume that the first address of the stage $PS_{21}$ is the five hundredth (500th) step of the read only memory ROM. The code converter CC functions to convert the key code signal "11000" into a code for selecting the five hundredth (500th) step of the read only memory ROM. The output signals of the address counter RAC are applied to the read only memory ROM through the decoder $DC_1$ for addressing the read only memory ROM.

(VIII-1) Treatment in ROM and Transcription to Ram (VIII-1-1) X Coordinates Setting The tulip pattern comprises twenty-one (21) stitches as shown in FIG. 16. At the step m14, the data "20" (010100) corresponding to the stitch number twenty-one (21) of the tulip pattern appear at the upper six (6) bits of the read only memory ROM as shown in FIG. 32. The data of the lower four (4) bits of the read only memory ROM are applied to the control signal generator CU to develop the micro-order (50). By this micro-order (50), the data "010100" stored in the upper six (6) bits of the read only memory ROM are introduced into the register NR through the AND gate AD.

Thereafter, the program is advanced to the step m15 to develop the micro-order (52). The contents "010100" of the register NR are transported to the first through sixth stages $WAC_1$ through $WAC_6$ of the address counter WAC. In this way, the twenty-first address of the random access memory RAM is selected. At the step m16, the micro-order (53) is developed to introduce information "0" into the seventh stage, $WAC_7$ of the address counter WAC. That is, the X coordinates data storage section RX of the random access memory RAM is selected. At the step m17, the first stitch data "11110" of the tulip pattern are developed from the upper five (5) bits of the read only memory ROM as shown in FIG. 33, and the lower five (5) bit data are applied to the control signal generator CU to develop the micro-order (51).

The micro-order (51) functions to supply the stitch data "1110" to the random access memory RAM via the AND gate AD, whereby the X coordinates setting data "11110" of the first stitch of the tulip pattern are introduced into the twenty-five (21st) step of the RX side of the random access memory RAM. After completion of the introduction of the first stitch data into the random access memory RAM, the program is advanced to the step m18. By the micro-order (55), the subtractor $SB_5$ functions to reduce the contents of the address counter WAC by one (1). The contents of the address counter WAC become nineteen (19), whereby the twentieth (20th) address of the random access memory RAM is selected. At the following step m19, the X coordinates setting data thirty (30) of the second stitch are introduced into the twentieth (20th) address of the random access memory RAM.

In this way the program is advanced, and the contents of the address counter WAC become "000000" when the step m22 is completed. At this moment, the first address of the random access memory RAM is selected, and the data "30" of the twenty-first stitch are introduced into the first address of the RX side of the random access memory RAM at the step m23.

(VIII-1-2) Y Coordinates Setting

At the following step m24, the micro-order (52) is developed to transport the stitch number data "20" from the register NR to the first through sixth stages $WAC_1$ through $WAC_6$ of the address counter WAC. That is, the twenty-first address of the random access memory RAM is selected. At the step m25, the information "1" is introduced into the seventh stage $WAC_7$ of the address counter WAC to select the RY side of the random access memory RAM. The first stitch Y coordinates data "23" are introduced into the twenty-first address of the RY side of the random access memory RAM at the step m26. In a same manner, the Y coordinates data of the tulip pattern are introduced into the twenty-first through first addresses of the RY side of the random access memory RAM in accordance with the steps m27 through m32.

(VIII-2) When Same Set Values Repeat

Figure 10:
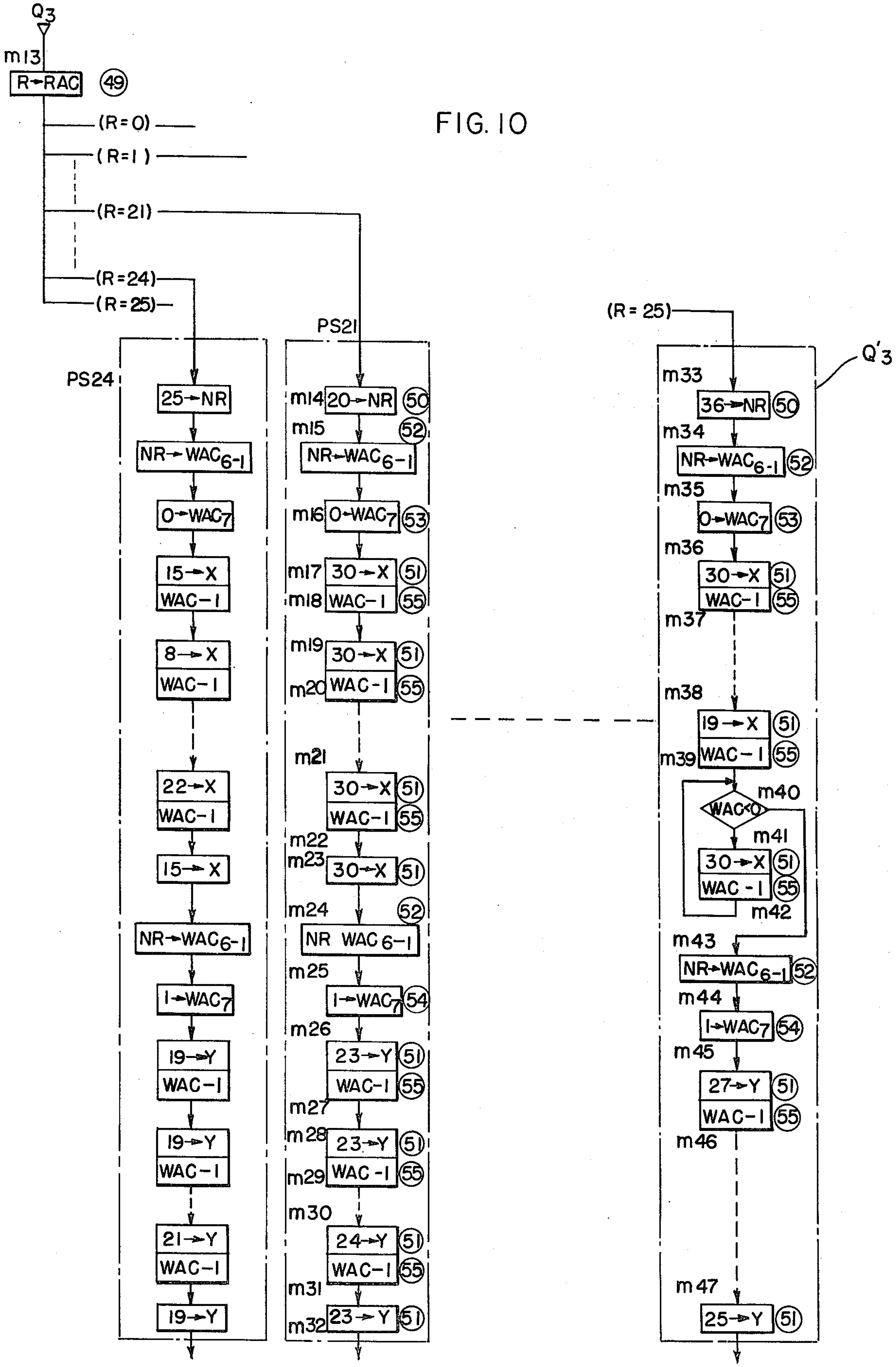

For example, the twenty-nineth stitch through the thirty-seventh stitch of the dog pattern have the same X coordinates "30" as shown in FIG. 21. In these cases, the program $Q_3'$ shown in FIG. 10 is used.

After introduction of the X coordinates setting data "19" of the twenty-eighth stitch of the dog pattern into the tenth address of the random access memory RAM at the step m38, the nineth address is selected at the step m39. At step m40, the contents of the address counter WAC are detected by the detection circuit $J_5$ whether the contents of the address counter WAC are zero. At this moment, the contents of the address counter WAC are "8" and, therefore, the program is advanced to the step m41. At the step m41, the data "30" of the twenty-nineth stitch are introduced into the nineth address of the RX side of the random access memory RAM.

At the following step m42, the eighth address is selected and the contents of the address counter WAC are reduced by one by the subtractor $SB_5$. Thereafter, the program is returned to the step m40. This operation is repeated to the first address which corresponds to the twenty-nineth stitch. After selecting the first address, the contents of the address counter WAC are "000000". Therefore, the data "30" are introduced into the first address at m41 and the program is returned to the step m40. At the step m42, the borrow operation occurs. Therefore, at the step m40, the detection circuit $J_5$ detects the fact that $WAC<0$. The program is advanced to the step m43 to complete the X coordinates setting.

(IX) Inverted Pattern Mode

Now assume that the inverted pattern formation key KIV is depressed after depression of the pattern selection key $P_i$. Firstly, the pattern data corresponding to the pattern selection key $P_i$ are introduced from the read only memory ROM to the random access memory RAM. Upon depression of the inverted pattern formation key KIV, the flip-flop FIV is set, and the detection circuit JK develops the "YES" output. The program step is advanced to n82 and, then, to n41→n42→n43→n44→n45→n46→n49→n50→n51→n52→n65→n67.

Figure 11:
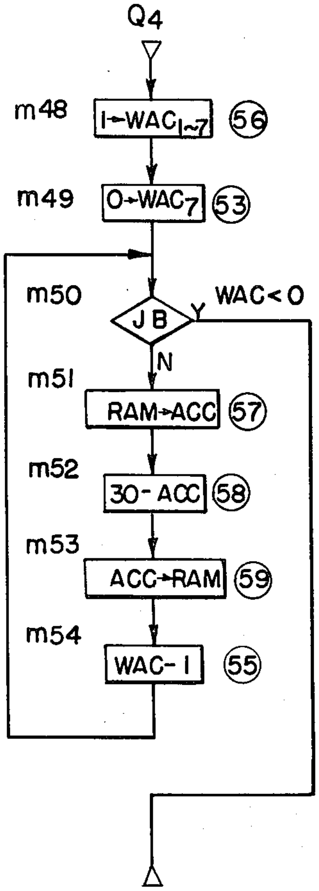
Figure 12:
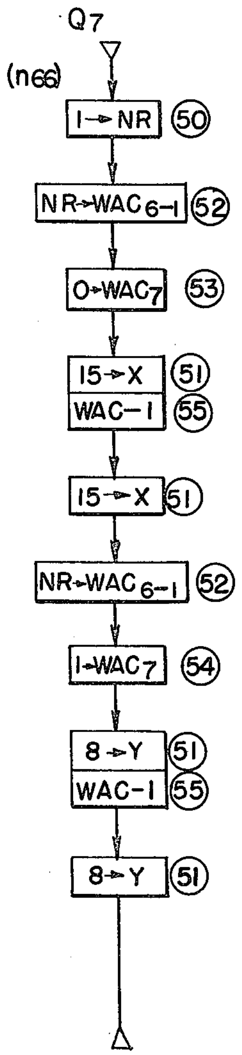

The program is advanced to the step n69 because the flip-flop FIV is set, and the pattern data inversion is achieved in accordance with the program $Q_4$ shown in FIG. 11. The pattern data inversion is conducted in accordance with the following formula.

$$30-X \text{ coordinates data}$$

The following TABLE I specifically shows the pattern data inversion.

TABLE I (PATTERN DATA INVERSION)

| POSITION | RX CODE | INVERTED RX CODE (11110 - RX) | POSITION |
|---|---|---|---|
| $X_0$ | 00000 | 11110 | $X_{30}$ |
| $X_1$ | 00001 | 11101 | $X_{29}$ |
| $X_2$ | 00010 | 11100 | $X_{28}$ |
| . | . | . | . |
| . | . | . | . |
| . | . | . | . |
| $X_{14}$ | 01110 | 10000 | $X_{16}$ |
| $X_{15}$ | 01111 | 01111 | $X_{15}$ |
| $X_{16}$ | 10000 | 01110 | $X_{14}$ |
| . | . | . | . |
| . | . | . | . |
| . | . | . | . |
| $X_{29}$ | 11101 | 00001 | $X_1$ |
| $X_{30}$ | 11110 | 00000 | $X_0$ |

At the step m48, the respective stages $WAC_1$ through $WAC_7$ of the address counter WAC receive the information "1". At the stage m49, the information "0" is introduced into the seventh stage $WAC_7$ of the address counter WAC, thereby selecting the last address, or, the sixty-fourth (64th) address of the RX side of the random access memory RAM. At the step m50, the contents of the address counter WAC are detected whether they are zero by the detection circuit $J_5$ and, then, the program is advanced to the step m51 to transport the contents of the sixty-fourth address of the random access memory RAM to the register ACC. The subtractor $SB_3$ conducts the following calculation at the step m52.

$$30(11110)-\text{contents of the register ACC}$$

The thus derived inverted data are returned to the sixty-fourth address of the RX side of the random access memory RAM at the step m53. At the step m54, the contents of the address counter WAC are reduced by one to select the sixty-third (63rd) address of the random access memory RAM. The program is returned to the step m50, whereby the data of the sixty-third (63rd)

address are introduced into the register ACC to obtain the inverted data.

The above-mentioned operation is repeated till the contents of the address counter WAC become "00000". When the contents of the address counter WAC become "00000", the first address data of the random access memory RAM are inverted, and the detection circuit $J_5$ develops an output signal "1" at the step m54 to complete the inversion treatment.

Thereafter the program is advanced in the following way.

n70→n73→n74→n75→n78→n79→n3

When the program is returned to the step n3, the inverted pattern data are stored in the respective addresses of the random access memory RAM.

When the stitch pattern selection key $P_i$ is depressed after depression of the inverted pattern formation key KIV, the pattern data previously stored in the random access memory RAM are inverted upon depression of the inverted pattern formation key KIV in the same manner as discussed above. Thereafter, the program is skipped from n7 to n82 upon depression of the pattern selection key $P_i$. And, then, the program is advanced to n39 to introduce the key code signal of the pattern selection key $P_i$ into the register R. The pattern data corresponding to the pattern selection key $P_i$ are written into the random access memory RAM in the normal way.

n39→n40→n41→n42→n43→n44→n45→n49→n50→n51→n52→n65→n67

The condition of the flip-flop FIV is detected at the step n68 to advance the program to the step n69, thereby inverting the pattern data stored in the random access memory RAM.

(X) Alternating Mode

In the alternating pattern formation mode, two kinds of stitch patterns are once alternatingly formed.

When a certain pattern key $P_{iA}$, the alternating stitch formation key KAL and another pattern key $P_{iB}$ are progressively depressed, the flip-flop FAL is set upon depression of the alternating stitch formation key KAL. The program is skipped from the step n7 to the step n82 in order to determine whether the depressed key is the pattern selection key. Then, the program is conducted in the following way.

n41→n43→n44→n45→n46→n49→n53

At the step n44, the flip-flop F is reset and, hence, the flip-flop F is turned set at the step n54. The key code signal stored in the register V is transported to the register R at the step n55.

After passing the step n65, the pattern data corresponding to the key code signal stored in the register R are introduced into the RX and RY sides of the random access memory RAM at the step n67. The key code signal stored in the register R is the key code signal related to the pattern selection key $P_{iA}$, which is previously selected in the register V before the alternating stitch formation key KAL is depressed. At the step n74, the stitch number data of the pattern corresponding to the pattern selection key $P_{iA}$ are transported from the register NR to the register N. The program is returned to n3 through n75 and n78.

When the second pattern selection key $P_{iB}$ is depressed, the key code signal corresponding to the pattern selection key $P_{iB}$ is introduced into the register R by the operation n3→n82→n39. At the step n40, the contents of the register R are introduced into the register U. At this moment, the previous data stored in the register U is transported to the register V. That is, after the step n40, the register V stores the key code signal related to the stitch pattern selection key $P_{iA}$, and the registers R and U store the key code signal related to the stitch pattern selection key $P_{iB}$ Thereafter, the program is advanced in the following way.

n41→n43→n44→n45→n46→n49→n53

Since the flip-flop F is set, the program is advanced to the step n56 to introduce the contents of the register U into the register R. At the step n67, the pattern data corresponding to the pattern selection key $P_{iB}$ are read out from the read only memory ROM and introduced into the RX and RY sides of the random access memory RAM. Thereafter, the program is returned to the step n3 through n68→n70→n73→n75→n78.

When the alternating stitch formation key KAL, the pattern selection key $P_{iB}$ and a further pattern selection key $P_{iC}$ are progressively depressed, the program is advanced in the following way.

n7→n82→n39→n40

The key code signal corresponding to the pattern selection key $P_{iC}$ is stored in the registers R and U, and the key code signal corresponding to the pattern selection key $P_{iB}$ is stored in the register V. The remaining operation is same as the abovementioned alternating mode.

(XI) Pattern Stitch Formation

Now assume that the needle 3 is positioned above the work, and the random access memory RAM stores the tulip pattern data.

When the foot switch SF is actuated, the needle 3 is driven to move downward, and the synchronization signal $\beta$ changes from "1" to "0". The program is advanced in the following way.

n8→n10→n11→n12

The micro-order (3) is developed at the step n12, whereby the Y coordinates data are transported to the register NY. The program $Q_5$ is conducted. At the step m55, the stitch number data "20" of the tulip pattern stored in the register N are introduced into the first through sixth stages of the address counter WAC. The twenty-first address of the random access memory RAM is selected. The twenty-first address stores the first stich data of the tulip pattern.

At the step m56, the information "1" is introduced into the seventh stage of the address counter WAC, whereby the RY side of the twenty-first address of the random access memory RAM is selected. At the following step m57, the Y coordinates data "23" stored in the twenty-first address of the random access memory RAM are introduced into the register NY. The thus derived data stored in the register NY are applied to the Y side WY of the register WN at the step n14.

Figure 14:
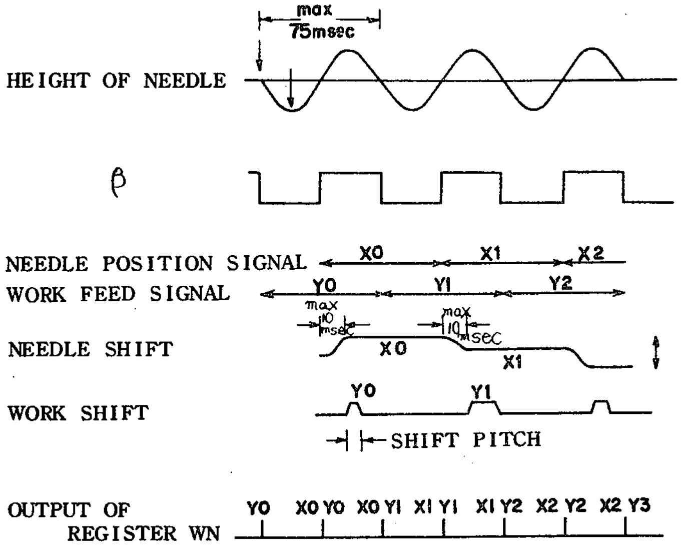
FIG. 14 is a time chart for explaining operation of the control system of FIGS. 6(A) through 6(D)

At the following step n15, the contents of the register NX are applied to the X side WX of the register WN. The data stored in the register NX at this moment are the data of the previous pattern. The previous data are introduced into the X side WX of the register WN to hold the needle 3 as shown in FIG. 14.

The contents of the register WN are transferred to the buffer register BFN at the step n16. The data stored in the buffer register BFN are applied to the linear motors 7 and 27 through the digital-to-analogue converters DAC. The linear motor 7 drives the needle 3 in accordance with the X coordinates data, and the linear motor 27 drives the work feed plate 4 in accordance with the Y coordinates data. Thereafter, the program is returned to the step n3.

When the needle 3 is separated from the work, the synchronization signal $\beta$ becomes "1", and the program n8→n9→n18→n19 is conducted. At the step n19, the Y coordinates data of the first stitch stored in the register NY are introduced into the Y side WY of the register WN.

At the step n20, the X coordinates data of the first stitch are introduced into the register NX in accordance with the program $Q_6$. The contents "20" (the first stitch data of the tulip pattern) of the register N are introduced into the address counter WAX at the step m58. At the following step m59, the information "0" is introduced into the seventh stage of the address counter WAC, whereby the RX side of the random access memory RAM is selected. The data stored in the twenty-first address of the RX side of the random access memory RAM are introduced into the register NX at the step m60. The thus introduced data are applied to the register WX at the step n21, and the data stored in the X and Y sections WX and WY of the register WN are introduced into the buffer register BFN at the step n22.

The data stored in the buffer register BFN are applied to the linear motors 7 and 27 through the digital-to-analog converter DAC to set the needle 3 at the X coordinates "30" and the work feed plate 4 at the Y coordinates "23". In this way, the first stitch of the tulip pattern is formed upon penetration of the needle 3.

Thereafter, the program is advanced in the following manner.

n22→n23→n24→n26

At the step n26, the contents of the register N is reduced by one, that is, the contents of the register N are charged from "20" to "19". The contents of the register N are determined whether they are smaller than zero at the step 36 and, then, the program is returned to the step n3.

When the synchronization signal $\beta$ becomes "0" after formation of the first stitch, the program is advanced in the following way to set the Y coordinates data.

N8→n10—n12

At this moment, the contents of the register N are "19", and the contents "19" are introduced into the first through sixth stages of the address counter WAC at the step m55, whereby the twentieth (20) address (corresponding to the second stitch) of the random access memory RAM is selected When the information "1" is introduced into the seventh stage $WAC_7$ at the step m56, the RY side data stored in the twentieth (20th) address of the random access memory RAM are introduced into the register NY at the step m57. That is, the second stitch Y coordinates data "23" of the tulip pattern are introduced into the register NY.

At the following step n14, the Y coordinates data stored in the register NY are introduced into the register WY. The first stitch X coordinates data stored in the register NX are again introduced into the register WX at the step n15, and the program is returned to the step n3. Therefore, after completion of the step n16, the Y coordinates data correspond to the second stitch, and the X coordinates data correspond to the first stitch.

When the needle 3 is separated from the work and the synchronization signal $\beta$ becomes "1", the program is advanced to set the X coordinates. At the step n19, the data "23" of the RY side of the twentieth (20th) address of the random access memory RAM are introduced into the register NY, and at the step n20, the data "30" of the RX side of the twentieth (20th) address of the random access memory RAM are introduced into the register NX. That is, the needle 3 is positioned at the X coordinates of the second stitch.

The above-mentioned operation is repeated till the contents of the register N become "0". When the contents of the register N become "0", the first address (corresponding to the twenty-first stitch of the tulip pattern) of the random access memory RAM is selected. At the step m60, the X coordinates data "30" of the first address of the random access memory RAM are introduced into the register NX. The data stored in the registr NX are introduced into the X side WX of the register WN at the step n21. The X coordinates data and the Y coordinates data are transferred to the buffer register BFN at the step n22 to set the needle 3 at the twenty-first stitch position "30". In this way, the twenty-first stitch is formed at X=30, Y=23.

At the step n26, the contents of the register N become negative, and the stitch formation of one tulip pattern is completed. Thereafter, the program is advanced in the following way.

n36→n37→n49→n50→n51→n58→n59→n60→n64

At the step n64, the contents of the register NR are reduced by one by the subtractor $SB_1$. That is, the contents of the register NR change from twenty (20) to nineteen (19). The thus created contents "nineteen (19)" are introduced into the register N at the step n74. Then, the program is returned to the step n3 through n75→n76→n78→n79.

When the foot switch SF is continuously actuated and the synchronization signal $\beta$ becomes "0", the program is advanced from n10 to n11, and the program $Q_5$ is conducted at the step n12. The contents of "19" of the register N are introduced into the address counter WAC. The information "1" is introduced into the seventh stage of the address counter WAC at the step m56, whereby the twentieth (20th) address of the RY side of the random access memory RAM is selected to introduce the second stitch Y coordinates data into the register NY. Thereafter, when the synchronization signal $\beta$ becomes "1", the second stitch X coordinates data stored in the twentieth (20th) address of the RX side of the random access memory RAM are introduced into the register NX. The above-mentioned operation is repeated to complete the pattern formation as long as the foot switch is actuated.

(XII) Why the Contents of Register NR is Reduced by "1" and the Results are Introduced into Register N at Step n64

This treatment is required to coorelate the single pattern formation mode and the continuous pattern formation mode. The operation will be described with reference to the blind stitch pattern shown in FIG. 15.

Figure 15:
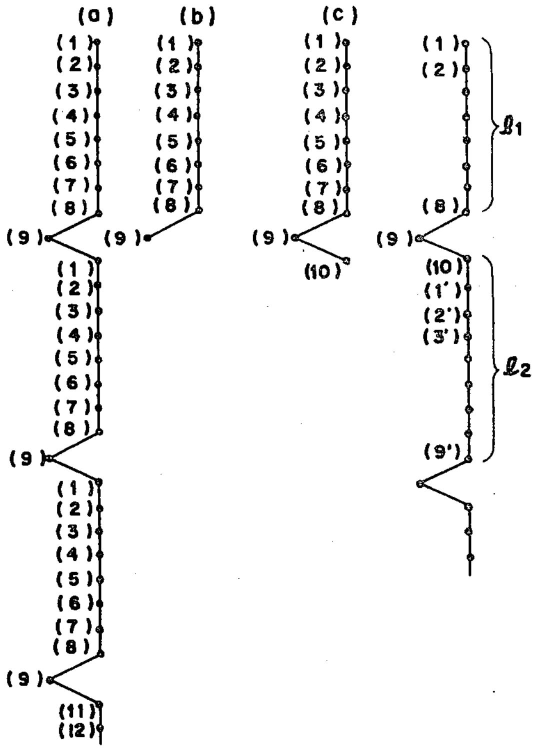
FIG. 15 is a chart for explaining variations of stitch numbers in the single stitch pattern mode and the continuous stitch pattern formation mode.

When the continuous stitch formation as shown in FIG. 15(*a*) is required, one pattern comprising stitches (1) through (9) shown in FIG. 15(*b*) is stored in the random access memory RAM. However, when the stitches (1) through (9) are also stored in the single pattern formation mode, the generated stitch pattern is not complete as shown in FIG. 15(*b*).

Contrarily, when one pattern comprising stitches (1) through (10) shown in FIG. 15(*c*) is stored in the random access memory RAM, the pattern generated in the continuous formation mode will become the pattern shown in the rightmost position of FIG. 15, where the length of the first pattern is shorter than that of the second pattern.

In the control system of the present invention, the random access memory RAM is constructed so as to store the pattern shown in FIG. 15(*c*). In the continuous formation mode, the first stitch of the n patterns, where $n \geqq 2$, is omitted by reducing the contents of the register NR by one.

(XIII) Pattern Formation in Alternating Mode

In the alternating pattern formation mode, as already discussed in the item (X), the register V stores the key code signal of the firstly operated pattern selection key $P_{iA}$ (pattern A), and the register U stores the key code signal of the secondly operated pattern selection key $P_{iB}$ (pattern B). The random access memory RAM stores the pattern data of the pattern A, and the flip-flops F and FAL are set.

Under these conditions, when the foot switch SF is actuated, the program is advanced in the following way.

N8→n10→n11

The Y coordinates data of the pattern A stored in the random access memory RAM are introduced into the register NY. The thus introduced data are applied to the register WN to set the Y coordinates. Then, the program is returned to the step n3 and advanced to n8→n9→n17 in order to introduce the X coordinates data of the pattern A into the register WN to form the pattern A.

When the contents of the register N become smaller than zero (0), the program is advanced in the following way since the flip-flop FAL is set.

n36→n37→n49, n53→n56

The flip-flop F is reset, and the key code signal of the pattern B stored in the register U is introduced into the register R at the step n57. At the following step n67, the pattern data of the pattern B are transferred to the RX and RY sides of the random access memory RAM. Thereafter, the program is advanced to n68→n70→n73→n74. The contents of the register NR corresponding to the pattern B are introduced into the register N. Then the program is returned to the step n3. In this way, the pattern A and the pattern B are formed.

When the stitch formation of the pattern B is completed, the program is advanced from the step n32 to the step n43 and, then, to the step n53. Since the flip-flop F is reset, the program is advanced to the step n54 to turn set the flip-flop F. At the step n55, the contents of the register V, or, the key code data of the pattern A are introduced into the register R to again form the stitch pattern of the pattern A.

In this way, in the alternating pattern formation mode, the flip-flop F is alternatingly set and reset at the steps n54 and n56 and, therefore, the register R alternatingly stores the contents stored in the register V and U. Consequently, the stitch data of the pattern A and the pattern B are alternatingly written into the random access memory RAM to alternatingly form the pattern A and the pattern B.

When the alternating pattern formation instruction key KAL is again depressed under the condition where the electronic sewing machine is placed in the alternating pattern formation mode, the T-type flip-flop FALT is turned reset. Upon depression of the alternating pattern formation instruction key KAL, the program is advanced to the step n24 through n7→n82→n41. The micro-order (13) is developed to write the key code signal stored in the register U, corresponding to the pattern B in this example, into the register V. That is, the registers U and V store the key code signal of the pattern B and, therefore, the pattern B is continuously formed.

(XIV) Single Pattern Formation Mode (But Not Alternating Mode)

In this mode, a desired pattern selection key $P_i$ and the single pattern formation instruction key KS are actuated.

When the pattern selection key $P_i$ is depressed, the pattern data corresponding to the selection key $P_i$ are introduced into the random access memory RAM in such a manner as discussed in the item (VIII). When the single pattern formation instruction key KS is depressed, the flip-flop FS is set. The program is advanced in the following way.

n7→n82→n41→n42→n43→n44→n45→n46→n49→n50

At the step N50, the contents of the register U, the key code of the pattern selection key $P_i$ in this example, are introduced into the register R. Therefore, the pattern data corresponding to the pattern selection key $P_i$ are introduced into the random access memory RAM as already discussed above. The programme is advanced to n68→n70→n71. Since the flip-flop T is reset at the step n43, the program is advanced to the step n74 to introduce the stitch number data of the pattern $P_i$ into the register N, and the program is returned to the step n3.

When the foot switch is actuated, one pattern is formed in such a manner as described in the item (VIII). When the contents of the register N become smaller than zero (0), the program is advanced to n36→n37→n49→n50→n51. The flip-flop K is previously reset at the step n52 of the previous cycle and, therefore, the program is advanced to the steps n61 and n62 through the step n58 to set the flip-flop $g_1$ at the step n62. The micro-order (22) is developed at the following step n63, whereby the information "15" (01111) is introduced into the entire addresses of the RY side of the random access memory RAM to stop the work feed The set condition of the flip-flop $g_1$ is detected by the step m3 of the step n13 of the following program. Therefore, the flip-flop $f_1$ is set at the step m61 in the next program. Thereafter, the micro-order (48) is developed at the step m9, whereby the contents "1" of the flip-flop $f_1$ are introduced into the first stage of the register WF through the gate $G_1$. The thus introduced data are applied to the buffer register BFF at the step n16 to turn OFF the clutch 12. Accordingly, only one pattern is formed even when the foot switch SF is continuously actuated.

(XV) Single Mode in Alternating Mode

Two kinds of the pattern selection keys $P_{iA}$ and $P_{iB}$, the single mode key KS, and the alternating mode key KAL are depressed in an arbitrary order.

The flip-flops FALT and FS are set. The program is advanced in the following way.

n7→n82→n41→n43→n44→n45→n46→n49→n83

Since the flip-flops T and F are reset at the step n43, the program is advanced in the following way.

n83→n53→n54→n55

The flip-flop F is set at the step n54, and the contents of the register V, or, the key code data of the firstly actuated pattern selection key, for example, $P_{iA}$, are introduced into the register R at the step n55. The program is advanced to n65→n67 in order to introduce the pattern data selected by the pattern selection key $P_{iA}$ into the random access memory RAM. Then, the program is returned to the step n3 to once form the pattern A.

When the formation of the pattern A is completed, the program is advanced to n36→n37→n49→n83. Since the flip-flop T is already set by the previous step n72, the program is advanced to the step n58, where the condition of the flip-flop FS is determined, and the program is advanced to the step n61. The condition of the flip-flop F is determined at the step n61, and the program is advanced to the step n56. The flip-flop F is turned reset, and the key code data corresponding to the pattern selection key $P_{iB}$ stored in the register U are introduced into the register R at the step n57. The program is advanced to n67 via n65 to introduce the pattern data of the pattern B into the random access memory RAM. Thereafter, the program is advanced to n70 via n68 to determine the condition of the flip-flop FS. Then, the program is advanced to the step n72. Since the flip-flop T is set, the program is advanced to the step n64, where the stitch number $N_B$ stored in the register NR is reduced by one, and the results $N_B-1$ are introduced into the register N. The program is returned to the step n3 via the step n75. By the operation of the steps n8 through n16 and n17 through n22, the pattern B is formed in succession to the pattern A.

When the contents of the register N become smaller than zero (0) by completing the stitch formation of the pattern B, the program is advanced in the following way.

n36→n37→n49→n83→n58→n61

The reset condition of the flip-flop F is detected at the step n61, and the program is advanced to the step n62. The flip-flop $g_1$ is turned set at the step n62 to turn OFF the clutch 12. Accordingly, only one pair of the patterns A and B are formed even when the foot switch is continuously actuated.

(XVI) Basting Stitch

In the basting stitch mode, the stitch is formed when the work is fed by thirteen (13) positions.

(XVI-1) Formation of Basting Stitch

When the basting stitch selection key $P_{16}$ is depressed, the program is advanced in the following way to introduce the key code signal "10010" of the basting stitch selection key $P_{16}$ into the register R.

n3→n4→n7→n82→n39

The thus introduced key code signal is introduced into the registers U and V at the step n40. Thereafter, the program is advanced in the following way to introduce the contents of the register U into the register R.

n43→n44→n45→n46→n49→n50

The flip-flop K is set and, therefore, the program is advanced to the step n52 to reset the flip-flop K. At the step n67 after the step n65, the basting stitch data stored in the read only memory ROM are introduced into the random access memory RAM in accordance with the key code signal stored in the register R.

Then, the program is advanced to n68→n70→n73→n74. At the step n74, the code "01100", which is smaller than the stitch number thirteen (13) of the basting stitch by one (1), is introduced from the register NR into the register N. The program is further advanced to n74→n78 through the step n75. The contents of the register R are detected by the detection circuit $J_1$, and the program is advanced to the step n80 to set the flip-flop $g_2$. Thereafter, the program is returned to the step n3.

The program is advanced to n3→n4→n7→n8. The synchronization signal $\beta$ becomes "0" when the needle 3 penetrates the work and, therefore, the program is advanced to n8→n10→n11→n12. The first stitch Y coordinates data "22" (see FIG. 22) are introduced from the random access memory RAM to the register NY, and then applied to the buffer register BFN. The work is fed forward by 13×7 pitches.

When the needle 3 is separated from the work, the synchronization signal $\beta$ becomes "1". The program is advanced to n8→n9→n17, whereby the X coordinates are set. At the step n18, since the flip-flop $g_2$ is previously set by the preceding step n80, the program $Q_2$ is conducted. The steps M10→m11 are performed to develop the micro-order (34), thereby setting the flip-flop $f_2$. At the step m12, the set condition of the flip-flop $f_2$ is transferred to the second stage of the register WF. The condition of the second stage of the register WF is transferred to the buffer register BFF at the step n22 to hold the needle 3 through the use of the stopper 32. This is because the basting stitch is one kind of the straight stitch.

The program is advanced from the step n23 to the step n24. Since the flip-flop $FP_{16}$ is in the set condition, the program is advanced to the step n25 to set the flip-flop $g_1$. Then, the program is returned to the step n3 via n26 and n36. At this state, the work feed and the needle position are set at the first stitch of the basting stitch and, therefore, the first stitch of the basting stitch is formed upon penetration of the needle 3.

When the synchronization signal $\beta$ becomes "0", the program is advanced to n8→n10→n11 to set the Y coordinates and returned to the step n3. Thereafter, when the synchronization signal $\beta$ becomes "1", the program is advanced to n8→n9→n17 to set the X coordinates. However, the flip-flop $g_1$ is previously set by the preceding step n25 for the first stitch and, therefore, at the secondly appearing step n18, the contents "1" of the flip-flop $g_1$ is transferred to the first stage of the register WF. And, then, the information "1" is transferred to the buffer register BFF at the step n22. Accordingly, the clutch 12 is turned OFF to maintain the needle 3 at its uppermost position even when the foot switch SF is continuously actuated. The work feed is conducted without forming the stitches.

The above-mentioned work feed is repeated twelve (12) times, and the contents of the register N becomes negative at the step n36 of the thirteenth (13th) cycle. Then, the program is advanced to the step n37. At the step n37, the set state of the flip-flop $FP_{16}$ is detected, and the program is advanced to the step n38 to reset the flip-flop $g_1$.

Thereafter the program is advanced in the following way.

n49→n50→n51→n58→n59→n60→n85→n64

The contents of the register NR are reduced by one "1", and the results are introduced into the register N to perform the continuous stitch formation. Then, the program is returned to the step n3 via n75→n78, whereby the operation is introduced into the second cycle of the continuous basting stitch.

The flip-flop $g_1$ is reset at the last step n38 of the first cycle and, therefore, the clutch 12 is turned ON. At the steps n18 and n22, the needle 3 is driven to travel downward to form the first stitch. Thereafter, the program is advanced to n24→n25 to again set the flip-flop $g_1$. The above-mentioned operation is repeated.

(XVI-2) Release of Bosting Stitch

When the heating stitch formation key $P_{16}$ is again depressed, the flip-flop $FP_{16}$ is reset through the OR gate $OR_1$ to release the program of the basting stitch.

(XVII) Button

In the button mode, the needle 3 is swung right and left without shifting the work position. The flip-flop $FP_{10}$ is set when the button key $P_{10}$ is depressed.

The program is advanced to n7→n$\mu$→n39 in order to introduce the key code signal related to the button key $P_{10}$ into the register R. The program is further advanced in the following way to introduce the button data shown in FIG. 19 stored in the read only memory ROM into the random access memory RAM.

n40→n41→n42→n43→n44→n45→n46→n51→n52→n65→n67

Then, the program is advanced in the following way.

n68→n70→n73→n74→n75→n78

The flip-flop $g_2$ is reset at the step n79, and the program is returned to the step n3. When the foot switch SF is actuated, and Y coordinates "15" are set by the program n8→n11. The X coordinates are set by the program n8→n17. The Y coordinates data are "15" and, therefore, the work feed is not conducted. The X coordinates are "0" for the first through third stitches. Accordingly, the needle 3 penetrates one hole of the button three times. Then, the needle 3 is shifted to the X coordinates "19" at the fourth stitch, and the needle 3 penetrates the other hole. Thereafter, the needle 3 is swung between "0" and "19" for each stitch.

When the formation of the nineth (9th) stitch is completed, the contents of the register N become zero (0) at the step n36. When the borrow operation occurs at the subtractor $SB_2$, the program is advanced in the following way.

n36→n37→n49→n50→n51→n58→n59→n60

Since the flip-flop $FP_{10}$ is set, the program is advanced to the step n61 after detecting the set state of the flip-flop $FP_{10}$ at the step n60. Since the flip-flop F is in the reset state, the program is advanced to the step n62 to set the flip-flop $g_1$. The clutch 12 is turned OFF and, therefore, the needle 3 is held at its uppermost position even when the foot switch SF is continuously actuated.

(XVIII) Buttonhole

Figure 24:
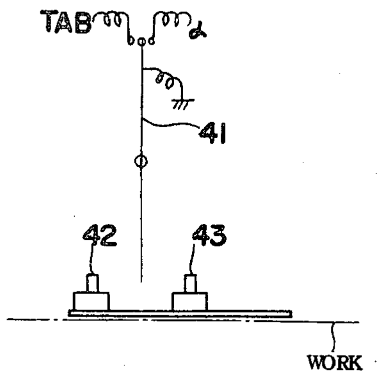
FIGS. 24(A) through 24(C) are schematic views for explaining operation of the bottom plate of FIG. 23.
Figure 23:
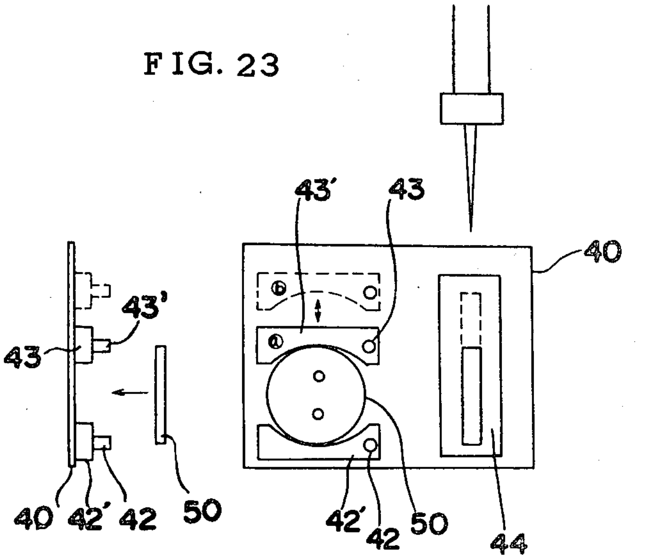
FIG. 23 is schematic plan and side views of a bottom plate for forming buttonholes.
Figure 24:
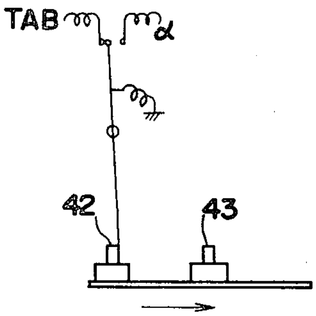

FIG. 23 shows a guide plate 40 for buttonholing. A button 50 is interposed between a stationary guide 42' and a movable guide 43'. The movable guide 43' is shifted toward the stationary guide 42' so as to sandwich the button 50. The guide plate 40 has an opening 44 through which the needle 3 is driven to travel. Projections 42 and 43 are formed on the guides 42' and 43', respectively. A movable contact 41 shown in FIGS. 24(A) through 24(C) is disposed above the guide plate 40. The movable contact 41 functions to develop signals TAB and $\alpha$ in response to its location.

The guide plate 40 is positioned on the work in such a manner that the opening 44 corresponds to the buttonhole to be formed. The corresponding button 50 is interposed between the guides 42' and 43', and the movable guides 43' is shifted to tightly support the button 50 between the guides 42' and 43'. The guide plate 40 is set at the position where the stationary guide 42' is located at one end of the buttonhole. At this moment, the movable contact 41 is positioned at the intermediate position and, hence, neither the signal TAB nor the signal $\alpha$ is developed.

When the buttonhole key $P_9$ is depressed, the flip-flop $FP_9$ is set, and the program is advanced to n7→n82→n39 to introduce the key code "01010" corresponding to the buttonhole key $P_9$ into the register R. The key code is introduced into the registers U and V by the program n40→n41→n42, and, then, the program is advanced to n43→—n46. The set state of the flip-flop $FP_9$ is detected at the step n46, and the program is advanced to n47→n48 to set the flip-flops G and $g_1$. The flip-flop G functions to distinguish the cycle for forming one side 51 of the buttonhole from the cycle for forming the other side 52 of the buttonhole. By setting the flip-flop $g_1$, the clutch 12 is turned OFF to automatically feed the work to the initial position of the buttonhole.

Thereafter, the program is advanced in the following way to introduce the data shown in FIG. 20(A) stored in the read only memory ROM into the random access memory RAM.

n49→n50→n51→n52→n65→n67

Then, the program is advanced to n68→n70→n73 to introduce the stitch number data "11" of the forward buttonholing from the register NR into the register N. Thereafter, the program is returned to the step n3 via n75→n78.

Thereafter, the Y coordinates "14" of the first stitch are introduced into the Y side of the buffer register BFN through the program n8→n10→n11—n16. The thus set condition is for feeding the work backward by one pitch. Since the flip-flop $g_1$ is in the set condition, the flip-flop $f_1$ is set and, consequently, the information "1" is introduced into the first stage of the buffer register BFF to turn OFF the clutch 12. After completion of the Y coordinates setting, the X coordinates data "15" are introduced into the X side of the buffer register BFN through the programme n8→n9→n17. Then, the program is advanced to n23→n27 and to n28 since the flip-flop G is in the set state. And the program is returned to the step n3 since the signal TAB is "0".

Under these conditions, when the foot switch SF is actuated, the needle 3 is held at the uppermost position while the work is fed backward by one (1) pitch. The projection 42 formed on the guide plate 40 becomes contact with the movable contact 41 by one pitch. When the foot switch SF is continuously actuated, the Y coordinates setting program n8→n10→n11 is again conducted upon inversion of the synchronization signal $\beta$ from "1" to "0". In the case where the signal TAB=0, the program is returned from n28 to n3 and, therefore, the contents of the register N are maintained at the initial values. That is, the eleventh (11th) address is again selected to feed the work backward by one pitch. The above-mentioned operation is repeated till the movable contact 41 is placed in the condition shown in FIG. 24(B), where the signal TAB becomes "1".

Figure 25:
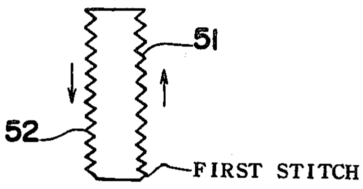
FIG. 25 is a chart showing a buttonhole stitch.
Figure 24:
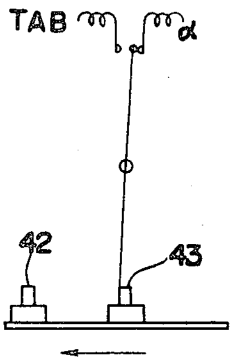

When the signal TAB becomes "1", the program is advanced to n27→n28→n29→n30 to reset the flip-flops G and $g_1$. The step n31 is conducted to reduce the contents of the register N by one (1). The address counter WAC selects the tenth (10th) address of the random access memory RAM. At the following X coordinates and Y coordinates setting operation, the second stitch data Y=15 and X=25 are read out from the random access memory RAM to place the needle 3 at X=25 and feed the work forward by one (1) pitch. At this moment, the needle and the work are positioned at the first stitch of the side 51 of the buttonhole shown in FIG. 25.

Since the flip-flop $g_1$ is reset at the preceding step n30, the flip-flop $f_1$ is reset at the step m14 of the step n13. The clutch 12 is turned ON to drive the needle 3, whereby the first stitch is formed.

The program is advanced to n22→n23→n27 and, then, to n31 since the flip-flop G is in the reset state. The contents of the register N are reduced by one (1). The program is returned from n32 to n3 to set the X and Y coordinates of the second stitch.

In this example, the first through sixth stitches do not feed the work and swing the needle 3 right and left. After the seventh stitch, the zigzag stitch pattern is formed.

When the one side of the buttonhole is formed and the contents of the register N become "0", the borrow operation occurs at the subtractor $SB_2$ at the step n31 and, therefore, the program is advanced to the step n33.

When the one side stitch formation of the buttonhole is not completed by the single set of operation of the buttonhole as shown in FIG. 20(A), the projection 43 formed on the guide plate 40 does not become contact with the movable contact 41 and, therefore, $\alpha=0$. Accordingly, the program is advanced to the step n34 and, then, to the step n35 since the signal TAB is also "0". The information "1" is introduced into the register N and the program is returned to n3. Thereafter, the programme is directed to the route n11 and n17. The second address of the random access memory RAM is selected, and the data Y=17, X=13 are read out from the random access memory RAM in the case of the embodiment of FIG. 20(A). Thereafter, the data Y=17, X=4 are set through the route n11 and n17 after again passing the step n3, whereby one zigzag pattern is formed.

The above-mentioned operation is repeated till the projection 43 becomes contact with the movable contact 41 to complete the stitch formation of the one side of the buttonhole. When the projection 43 becomes contact with the movable contact 41, the signal $\alpha$ becomes "1". The program is advanced to n86 from n33 to introduce the data shown in FIG. 20(B) for forming the stitches on the other side of the buttonhole into the random access memory RAM.

The program is advanced in the following way to set the first stitch data of the other side of the buttonhole.

n68→n70→n73→n74→n75→n78→n3

The stitch formation is same as that is conducted for the one side of the buttonhole. When the projection 43 formed on the guide plate 40 becomes contact with the movable contact 41 as shown in FIG. 24(C), the signal TAB becomes "1". The program is advanced to n50→n63. At the steps n62 and n63, the flip-flop $g_1$ is set, and the data "15" are introduced into the Y side of the register WN. The clutch 12 is turned OFF to complete the buttonhole operation.

(XIX) Reverse Mode

When the electronic sewing machine is not placed in the alternating pattern formation mode, the program is advanced in the following way upon depression of the reverse key KR.

n3→n84→n5→n43→n44→n45→n46→n49→n50→n-
51→n65→n66

At the step n66, the program shown in FIG. 10 is conducted. This program is same as that shown in FIG. 12.

By the above-mentioned operation, the reversed pattern data are introduced into the random access memory RAM. The flip-flop $g_2$ is set at the step n80 and the program is returned to the step n3. Since the flip-flop $g_2$ is set, the needle 3 is locked by the stopper 32.

When the reverse key KR is continuously depressed, the program is advanced to n3→n84, and then to n84→n8 since the flip-flop RV is set by the step n5. In this way, the Y coordinates and the X coordinates are set to form reversed stitch patterns.

When the one pattern formation is completed, the program is advanced to n36→n37→n49→n50→n51→n58→n59→n65→n85. The flip-flop RV is set as long as the reverse key KR is depressed and, therefore, the program is advanced to n66 to again introduce the reversed pattern data into the random access memory RAM. The above-mentioned operation is repeated as long as the reverse key KR is depressed.

When the reverse key KR is released, the program is advanced to n3→n4. The flip-flop RV is reset at the step n6, and the program is advanced to the step n43.

Thereafter, the program is advanced in the following way to introduce the key code signal corresponding to the pattern selection key which is depressed immediately before the reverse key KR is depressed into the register R.

n43→n44→n45→n46→n49→n50

At the step n51, the program is advanced to n52→n65→n67 since the flip-flop K is set. Accordingly, the above-mentioned key code signal is used to introduce the pattern data into the random access memory RAM. Thereafter, the program is advanced to n68→n70→n73→n74 to introduce the stitch number data of the previously selected pattern into the register N. The program is advanced to n75→n78 to reset the flip-flop $g_2$ at the step n79 if the previously selected pattern is not the straight stitch. The stopper 32 is released. Accordingly, the previously selected stitch pattern is continuously formed as long as the foot switch FS is actuated.

(XX) Speed Control

When a single pattern includes the work feed in the both forward and backward directions (stitch patterns corresponding to the selection keys $P_{11}$ through $P_{25}$), the work feed speed must be controlled slow in order to ensure the stable stitch formation.

When the key code is greater than eleven (11), the detection output of the detection circuit $J_2$ is "1" at the step n75, thereby setting the flip-flop $g_4$ at the step n77. The set state of the flip-flop $g_4$ is detected at the step m5 of the step n13 of the Y coordinates setting program and, therefore, the flip-flop $f_4$ is turned to set at the step m64. Thereafter, the information "1" is introduced into the fourth bit of the buffer register BFF by the treatment of the steps m9 and n16 to develop a speed control signal. The thus developed speed control signal is applied to the control circuit SC to slow down the speed of the motor 2.

(XXI) Balance Control

In the balance control, the work feed length is slightly increased when the feed direction is inverted from the forward direction to the backward direction in order to ensure the stable stitch formation.

In this example, the amplifying factor of the amplifier AY of the digital-to-analogue converter DACY is increased. When the balance control signal is not developed, the amplifier AY functions to develop the normal output in response to the output signal of the digital-to-analogue converter DACY. Contrarily, when the balance control signal is developed, the gain of the amplifier AY is slightly increased.

Figure 28:
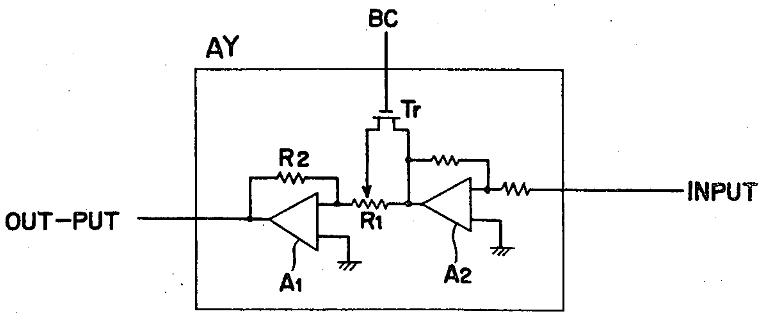
FIG. 28 is a circuit diagram of an amplifier for performing the balance control operation.

FIG. 28 shows an example of the amplifier AY suited for performing the balance control operation.

The amplifier AY mainly comprises normal amplifiers $A_1$ and $A_2$, which are connected to each other through a variable resistor $R_1$. The output of the amplifier $A_1$ is fed back through another resistor $R_2$. An MOS transistor Tr is connected between the amplifier $A_2$ and the variable contact of the variable resistor $R_1$. The gate electrode of the MOS transistor Tr is connected to receive the balance control signal BC.

When the balance control signal BC is "0", the MOS transistor Tr is OFF and, therefore, the gain of the amplifier $A_1$ is determined by the ratio of the resistors $R_1$ and $R_2$. Contrarily, when the balance control signal BC is "1", the MOS transistor Tr is turned ON and, therefore, the effective resistance of the variable resistor $R_1$ is reduced. Accordingly, the gain of the amplifier $A_1$ is increased.

When the output level of the amplifier AY is increased, the operation value of the linear motor 27 is increased to increase the work feed length. The resistance value of the variable resistor $R_1$ is controlled in accordance with the kinds of the work and the kinds of the stitch patterns.

The backward feed of the work is detected by the detection circuit $J_3$, which functions to determine whether the contents of the register NY are below fifteen (15) at the step m7.

When the contents of the register NY are below fifteen (15), the flip-flop $f_3$ is turned set at the step m63. The contents "1" of the flip-flop $f_3$ are introduced into the third stage of the register WF at the step m9. Then, the third stage of the buffer register BFF is forced to "1" at the step n16 to develop the balance control signal BC.

Figure 26:
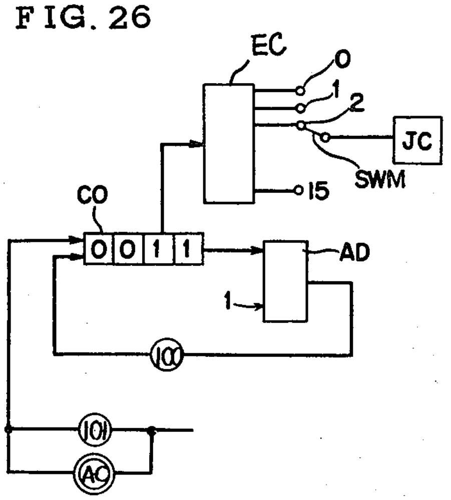
FIG. 26 is a block diagram of another embodiment of a balance control circuit included within the control system of the present invention.

In the foregoing embodiment, the balance control signal BC is always developed when the work is fed backward. However, it is preferable that the balance control operation be performed for a short while following a time when the work feed direction is changed from the forward to the backward. FIG. 26 shows an example of the balance control signal generation circuit which develops the balance control signal BC for a predetermined period of time following the time when the work feed direction is inverted from the forward to the backward.

A counter CO functions to count the succeeding stitch number when the Y data are below fifteen (15). The contents of the counter CO are converted into the decimal data by an encoder EC. A determination circuit JC is connected to the encoder EC through a stitch SWC which selects the stitch number to which the balance control operation be conducted.

Figure 27:
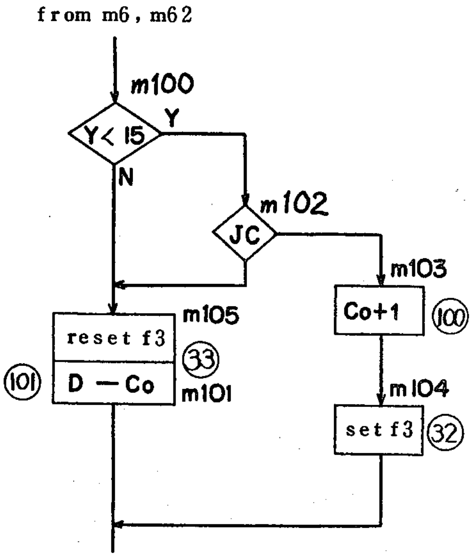
FIG. 27 is a program chart of the balance control circuit of FIG. 26.

The operation program of the balance control signal generation circuit of FIG. 26 is shown in FIG. 27. When $Y \geqq 15$, the information "0000" is applied to the counter CO at the step m101 to reset the counter CO. The flip-flop $f_3$ is turned reset at the step m105, and the program is advanced to the step m9.

When $Y < 15$, the contents of the counter CO are judged at the step m102. When the switch SWC is set at three (3), the output of the determination circuit JC is "0". The contents of the counter CO are increased by one (1) at the step m103, and the flip-flop $f_3$ is turned set at the step m104, whereby the balance control signal BC is developed.

When the one stitch formation is completed, the program is again directed to the step m100. At this moment, when the work is still fed backward and $Y < 15$, the program is advanced to the step m102 for determination purposes. The contents of the counter CO are increased by one (1) at the step m103 and, then, the program is advanced to the step m104→m9. When the backward feed is repeated for more than three (3) stitches, the determination output of the determination circuit JC becomes "1". Then, the program is advanced to the step m105 to reset the flip-flop $f_3$, whereby the balance control signal BC disappears, and the counter CO is reset.

(XXII) Indication Lamp Drive

Figure 29:
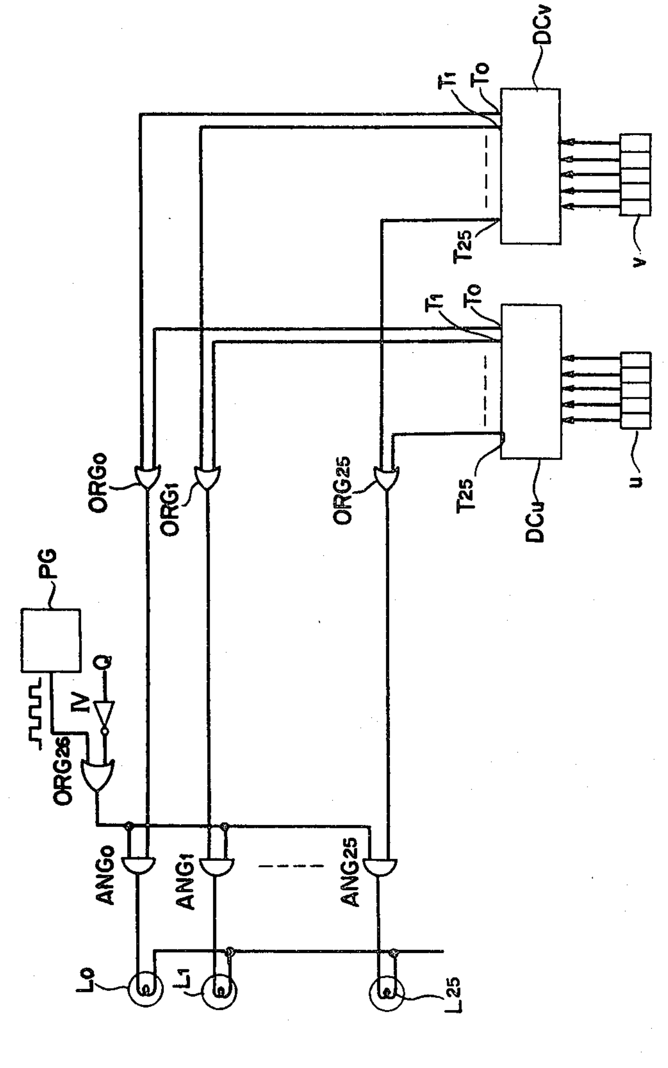
FIG. 29 is a block diagram of a driver circuit of indication lamps.

FIG. 29 shows a driver circuit for driving the indication lamps $L_0$ through $L_{25}$. Decoders $DC_u$ and $DC_v$ function to develop output signals through the output terminals $T_0$ through $T_{25}$ in response to the key code signals stored in the registers U and V, respectively. The output signals of the decoders $DC_u$ and $DC_v$ are applied to AND gates $ANG_0$ through $ANG_{25}$ via OR gates $ORG_0$ through $ORG_{25}$, respectively. A lamp enabling pulse signal is developed from a pulse generator PG, and is applied to an OR gate $ORG_{26}$. The other input terminal of the OR gate $ORG_{26}$ is connected to receive the output signal of the flip-flop Q via an inverter IV. The output signal of the OR gate $ORG_{26}$ is applied to the AND gates $ANG_0$ through $ANG_{25}$, which develop the driving signals to the indication lamps $L_0$ through $L_{25}$.

When the system is not placed in the alternating mode, the registers U and V store the same information and, therefore, the decoders $DC_u$ and $DC_v$ develop the same output signal. Since the flip-flop Q is reset except in the single mode, the indication lamp corresponding to the information stored in the registers U and V is continuously enabled.

When the system is placed in the alternating mode, the register U stores the key code data corresponding to the second pattern, and the register V stores the key code data corresponding to the first pattern. Two indication lamps are simultaneously enabled to indicate the selected two patterns.

In the single pattern formation mode, the flip-flop Q is turned set at the step n62 and, therefore, the output of the inverter IV becomes "0". Accordingly, the output of the OR gate $ORG_{26}$ corresponds to the output signal of the pulse generator PG. The indication lamp corresponding to the selected pattern flickers in response to the output signal of the pulse generator PG. When the single pattern formation mode is released, the flip-flop Q is reset at the step n43, whereby the flicker of the indication lamp is terminated.

(XXIII) Manual Set of Work Feed Length

Figure 30:
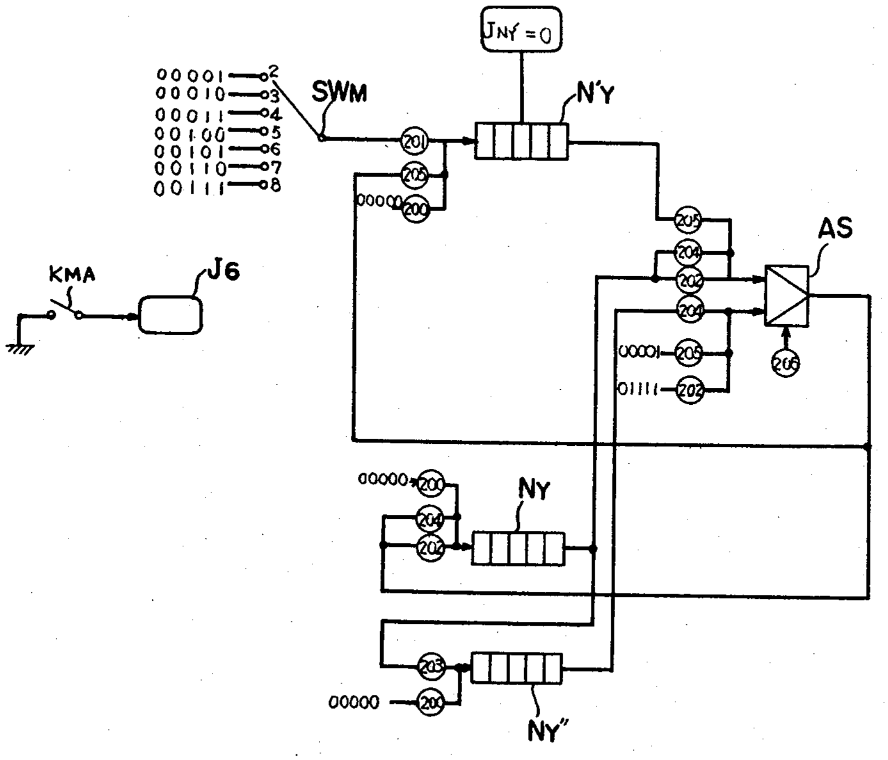
FIG. 30 is a block diagram of a circuit for determining the multiplication factor of the work feed length.
Figure 31:
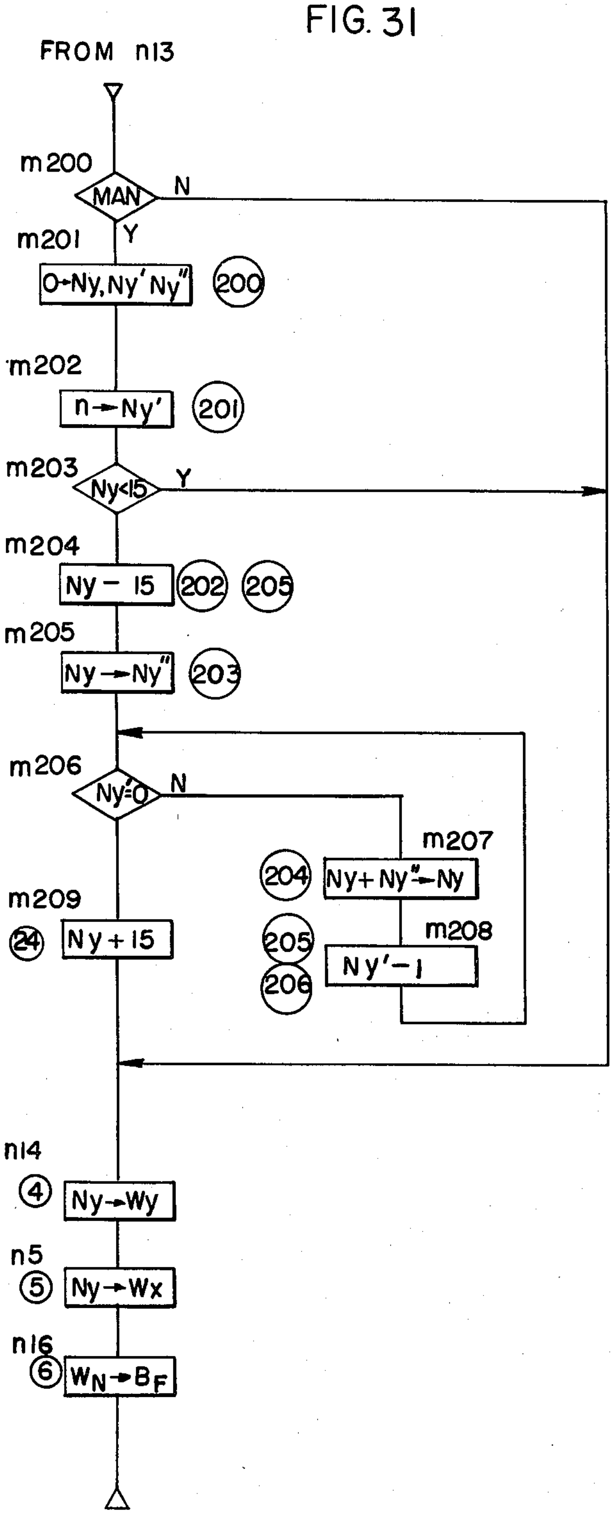
FIG. 31 is a program chart of the circuit of FIG. 30.

FIG. 30 shows an example of a circuit for multiplying the work feed length unit by n in response to the actuation of the manual/auto selection switch KMA. The operation program of the circuit of FIG. 30 is shown in FIG. 31.

The circuit mainly comprises a multiplication factor setting switch SWM, and a detection circuit $J_6$ for detecting the condition where the manual/auto selection switch KMA is inclined to the manual mode.

When the manual/auto selection switch KMA is inclined to the auto mode, the detection output of the detection circuit $J_6$ is "0" and, therefore, the program is advanced from m200 to the step n14 to control the system in the normal mode.

When the manual/auto selection switch KMA is inclined to the manual mode, the detection output of the detection circuit $J_6$ becomes "1" and, therefore, the program is advanced from the step m200 to the step m201. Five (5) bit registers NY, N'Y and NY" are reset to zero (0).

The multiplication factor n determined by the multiplication factor setting switch SWM is introduced into the register N'Y at the step m202. At the step m203, the contents of the register NY are determined whether they are greater than or smaller than fifteen (15). When the contents of the register NY are greater than fifteen (15), the program is advanced to the step m204. The contents of the register NY are reduced by fifteen (15) at an adder/subtractor AS to provide an absolute value of the work feed length. After completion of the above operation, the contents of the register NY are transferred to the register NY" at the step m205. At the step m206, the multiplication factor stored in the register N'Y is checked.

At the step m207, the contents stored in the register NY are added to the contents stored in the register NY", the results being introduced into the register NY. At the step m208, the contents of the register N'Y are reduced by one (1). Thereafter, the program is returned to the step m207 to repeat the above-mentioned operation till the contents of the register N'Y become zero (0). When the above-mentioned operation is completed, the contents of the register NY are increased by fifteen (15) at the step m209, and the result is introduced into the register WY to drive the linear motor 27.

When the contents of the register NY are below fifteen (15), or, when the work is fed backward, the program is skipped to the step n14 by the judgment at the step m203, whereby the manual set modification is not conducted.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an electronic sewing machine which forms a stitch pattern in response to an output signal from a control system, the control system comprising:

- a first memory means for storing digital information related to stitch patterns and control instructions for stitch formation purposes:
- a keyboard means for selecting a desired stitch pattern stored in said first memory means;
- a register for storing a key-code signal of the selected stitch pattern;
- means for developing first digital data stored in said first memory means in accordance with said key-code signal stored in said register;
- a second memory means for storing said first digital data derived from said first memory means, said second memory means having a memory capacity greater than the capacity required to store data associated with one stitch pattern;
- means for developing second digital data from said second memory means in accordance with the first digital data from said second memory means in accordance with the first digital data stored in said second memory means and the control instructions stored in said first memory means;
- a digital-to-analogue converter means for converting said second digital data into analogue signals; and
- means for supplying said analogue signals to a stitch forming section of the electronic sewing machine.

2. The control system of claim 1, which further comprises indication means responsive to actuation of said keyboard means for indicating the specific stitch pattern selected through actuation of said keys on said keyboard means.

3. The control system of claim 1, wherein said first memory means is a read only memory and said second memory means is a random access memory.

4. The control system of claim 1, which further comprises an auto clear means for placing the electronic sewing machine in the normal straight stitch formation mode when a main power switch of the electronic sewing machine is closed.

5. The control system of claim 1, wherein said register means stores the key code signal of the last selected stitch pattern.

6. An electronic sewing machine which forms stitch patterns in response to output signals from a control system, said control system comprising:

first memory means for storing digital information related to various stitch patterns;

means for selecting desired stitch patterns stored in said first memory means and developing first digital data related to selected switch patterns from said first memory means;

second memory means for storing said first digital data derived from said first memory means, said second memory means having a memory capacity capable of storing a predetermined quantity of digital data, said predetermined quantity being greater than the quantity of data associated with a specific one stitch pattern;

means for developing second digital data from said second memory means in accordance with said first digital data stored in said second memory means in response to stitch formation conducted by said electronic sewing machine; and drive means for driving a stitch forming section of the electronic sewing machine in accordance with said second digital data.

7. The electronic sewing machine of claim 6, wherein said first memory means stores instruction commands, said instruction commands controlling the transfer of said first digital data from said first memory means to said second memory means.

8. The electronic sewing machine of claim 7, wherein said instruction commands function to modify said first digital data stored in said second memory means.

9. The electronic sewing maching of claim 6, wherein said drive means include a needle position control means for selecting a desired location of a needle within a predetermined number of different positions, and a work feed control means for shifting a work feed plate by a desired length.

10. The electronic sewing machine of claim 9, wherein said second digital data comprises needle position information and work feed control information.

11. The electronic sewing machine of claim 10, further comprising: inversion means for rotating the stitch pattern by 180°.

12. The electronic sewing machine of claim 11, wherein said inversion means comprises a calculation means for conducting the following calculation:

(said predetermined number of different positions of said needle) (said needle position information)

13. The electronic sewing machine of claim 6, further comprising:

mode selection means for placing the electronic sewing machine in a single stitch formation mode wherein only one type of stitch pattern is formed.

14. An electronic sewing machine which forms stitch patterns in response to output signals from a control system, said control system comprising:

memory means for storing digital information related to various stitch patterns;

means for selecting desired stitch patterns stored in memory means and developing digital data related to said selected stitch patterns;

means for applying said digital data to a control means for driving a stitch forming section included in the electronic sewing machine;

main power switch means for selectively applying electric power to said electronic sewing machine; and autoclear means for placing the electronic sewing machine in the normal straight stitch formation mode in response to an initial application of electric power to said electronic sewing machine through said main power switch means.

15. The electronic sewing machine according to claim 14, wherein the means for applying said digital data includes:

positioning register means for temporarily storing said digital data; and wherein when the main power is applied, straight stitch information is immediately applied to said positioning register means by said auto clear means to guarantee the application of only straight stitch information to said control means.

16. The electronic sewing machine according to claims 14 or 15, wherein the means for applying said digital data includes:

random access memory means for temporarily storing said digital data; and wherein when the main power is applied, straight stitch information is immediately applied to said random access memory means by said auto clear means to erase any pattern stitch formation.

17. An electronic sewing machine which forms stitch patterns in response to output signals from a control system, said control system comprising:

memory means for storing digital information related to various stitch patterns;

means for applying said digital information to control means for driving a stitch forming section included in the electronic sewing machine; and alternating pattern formation means for automatically alternating the application of two different kinds of digital data to said control means so that two different stitch patterns are alternatingly formed.

18. An electronic sewing machine performing stitching operations and having a housing, a needle, and a work feed plate, comprising:

pattern selecting means on said housing of said electronic sewing machine for selecting a desired stitch pattern and a desired stitching control instruction, said pattern selecting means comprising a plurality of stitch pattern key means and a plurality of control instruction selection key means, said stitching control instruction defining the desired operational mode of said stitching operation;

first memory means, for storing program instructions relating to said stitch patterns and said control instructions; locating means responsive to actuation of said pattern selecting means for locating said program instructions related to said selected stitch pattern and said selected control instruction in said first memory means, said first memory means generating first digital data in response to location of said program instructions in said first memory means, said first digital data being representative of said program instructions associated with said selected stitch pattern and said selected control instruction;

second memory means responsive to said first digital data for storing said first digital data and for storing pattern data positional information associated with said needle and said work feed plate, said second memory means having a memory capacity capable of storing said pattern data associated with all of said plurality of stitch patterns, said second memory means generating second digital data representing positional control instructions associated with one stitch of said stitch pattern, converter means responsive to said second digital data, for converting said second digital data into analogue signals representative of said positional control instructions; and drive means responsive to said analogue signals for controlling movement of said needle and said work feed plate in accordance with said analogue signals.

19. An electronic sewing machine in accordance with claim 18 wherein said first memory means comprises a read-only-memory (ROM).

20. An electronic sewing machine in accordance with claim 19 wherein said read-only-memory further comprises a first group of stages and a second group of stages, each stage of said first group containing said program instructions relating to said stitch patterns and each stage of said second group containing said program instructions relating to said control instructions.

21. An electronic sewing machine in accordance with claim 18 wherein said locating means comprises:

means responsive to actuation of said pattern selecting means for generating a digital key-code signal representative of said selected desired stitch pattern;

register means for temporarily storing said digital key code signal;

said register means having an output; and addressing means responsive to said output of said register means for developing address codes in accordance with said key-code signal, said address codes, being representative of said locations in said first memory means occupied by said program instructions associated with said selected stitch pattern and said selected control instruction.

22. An electronic sewing machine in accordance with claim 21, wherein said first memory means comprises a read-only-memory (ROM), said read-only-memory further comprising a first group of stages and a second group of stages, each stage of said first group containing said program instructions relating to said stitch patterns and each stage of said second group containing said program instructions relating to said control instructions.

23. An electronic sewing machine in accordance with claim 18, wherein said second memory means comprises:

a random access memory (RAM), said random access memory further comprising a plurality of stages, each stage comprising a first location and a second location, said first location containing pattern data positional information associated with said needle, said second location containing pattern data positional information associated with said work feed plate; and means, responsive to said first digital data, for selecting one of said stages of said random access memory for storage of said first digital data and for selecting said first location or said second location in response to the presence of needle or work feed plate positional information in said first digital data, respectively.

24. An electronic sewing machine in accordance with claim 23 wherein said second memory means further comprises:

register means responsive to an output form said random access memory, for storing needle and work feed plate positional data for one stitch, said register means comprising a first register containing said needle positional data for one stitch and a second register containing said corresponding work feed plate positional data for said one stitch.

25. A electronic sewing machine in accordance with claim 23 wherein said first memory means comprises a read-only-memory (ROM), said read-only-memory further comprising a first group of stages and a second group of stages, each stage of said first group containing said program instructions relating to said stitch patterns and each stage of said second group containing said program instructions relating to said control instructions, said locating means comprising means responsive to actuation of said pattern selecting means for generating a digital key-code signal representative of said selected desired stitch pattern;

register means for temporarily storing said digital key-code signal, said register means having an output; and addressing means responsive to said output of said register means for developing address codes in accordance with said key-code signal, said address codes being representative of said locations in said first memory means occupied by said program instructions associated with said selected stitch pattern and said selected control instruction.

26. An electronic sewing machine in accordance with claim 25, wherein said second memory means further comprises:

register means responsive to an output from said random access memory, for storing needle and work feed plate positional data for one stitch, said register means comprising a first register containing said needle positional data for one stitch and a second register containing said corresponding work feed plate positional data for said one stitch.

27. An electronic sewing machine in accordance with claim 17 wherein said converter means comprises a digital to analogue converter.

28. An electronic sewing machine in accordance with claim 18 wherein said drive means comprises needle drive means for selectively moving said needle in the horizontal and vertical directions; and work feed plate drive means, interconnected with said needle drive means, for selectively moving said work feed plate in the horizontal and vertical directions, said selective movement of said needle and said work feed plate being accomplished in accordance with drive instructions present within said analogue signals output from said converter means.

29. An electronic sewing machine in accordance with claim 28 wherein said first memory means comprises a read-only-memory (ROM), said read-only-memory further comprising a first group of stages and a second group of stages, each stage of said first group containing said program instructions relating to said stitch patterns and each stage of said second group containing said program instructions relating to said control instructions, said second memory means comprising a random access memory (RAM), said random access memory further comprising a plurality of stages, each stage comprising a first location and a second location, said first location containing pattern data positional information associated with said needle, said second location containing pattern data positional information associated with said work feed plate; and means, responsive to said first digital data, for selecting one of said stages of said random access memory for storage of said first digital data and for selecting said first location or said second location in response to the presence of needle or work feed plate positional information in said first digital data, respectively, said second memory means further comprising register means responsive to an output from said random access memory, for storing needle and work feed plate positional data for one stitch, said register means comprising a first register containing said needle positional data for one stitch and a second register containing said corresponding work feed plate positional data for said one stitch.

30. An electronic sewing machine in accordance with claim 18 wherein said control instruction selection key means comprises;

a single stitch formation key means for forming a single straight stitch;

an inverse stitch information key means for superimposing an inverted version of said stitch upon itself by rotating said stitch pattern 180 degrees after the completion of one stitch;

an alternating stitch formation key means for alternatively forming a first and second stitching pattern, said first pattern for one stitch preceding said second pattern for a succeeding stitch; and a reverse stitch formation key means for superimposing a selected stitching pattern upon itself after the completion of one stitch.

31. In an electronic sewing machine which forms a stitch pattern in response to an output signal from a control system, the control system comprising:

a first memory means for storing digital information related to stitch patterns and control instructions for stitch formation purposes;

a keyboard means for selecting a desired stitch pattern stored in said first memory means;

a register for storing a key code signal of the selected stitch pattern;

means for developing first digital data stored in said first memory means in accordance with said key code signal stored in said register;

a second memory means for storing said first digital data derived from said first memory means;

means for developing second digital data from said second memory means in accordance with the first digital data stored in said second memory means and the control instructions stored in said first memory means;

a digital-to-analogue converter for converting said second digital data into analogue signals;

means for supplying said analogue signals to a stitch forming section of the electronic sewing machine;

said register storing the key code signal of the last selected stitch pattern;

an alternating pattern formation instruction key;

another register for storing a key code signal of a previously selected stitch pattern through said keyboard means; and detection means for detecting the actuation of said alternating pattern formation instruction key, whereby two kinds of digital data are alternatingly developed from said first memory means in accordance with the two key code signals stored in said two registers.

* * * * *